United States Patent [19]
Adelmann et al.

[11] Patent Number: 4,726,019
[45] Date of Patent: Feb. 16, 1988

[54] DIGITAL ENCODER AND DECODER SYNCHRONIZATION IN THE PRESENCE OF LATE ARRIVING PACKETS

[75] Inventors: Harry W. Adelmann, Neptune; George R. Tomasevich, Middletown, both of N.J.

[73] Assignee: American Telephone and Telegraph Company, AT&T Bell Laboratories, Murray Hill, N.J.

[21] Appl. No.: 834,965

[22] Filed: Feb. 28, 1986

[51] Int. Cl.[4] .......................... H04J 3/24; H04Q 11/04
[52] U.S. Cl. ........................................... 370/94; 370/60
[58] Field of Search ............................ 370/60, 94, 108; 375/27

[56] References Cited
U.S. PATENT DOCUMENTS

| | | | |
|---|---|---|---|
| 4,100,377 | 7/1978 | Flanagan | 370/94 |
| 4,317,195 | 2/1982 | Barberis et al. | 320/94 |
| 4,320,500 | 3/1982 | Barberis et al. | 370/60 |
| 4,437,087 | 5/1984 | Petr | 340/347 |
| 4,450,554 | 5/1984 | Steensma et al. | 370/4 |
| 4,453,247 | 6/1984 | Suzuki et al. | 370/60 X |
| 4,475,213 | 10/1984 | Medaugh | 375/27 |
| 4,491,945 | 1/1985 | Turner | 370/60 |
| 4,506,358 | 3/1985 | Montgomery | 370/60 |
| 4,518,950 | 5/1985 | Petr | 375/27 X |
| 4,538,259 | 8/1985 | Moore | 370/60 |
| 4,592,070 | 6/1986 | Chow et al. | 375/27 |

OTHER PUBLICATIONS

CCITT Recommendation, Fascicle III.3—Rec.G.721, 7.2 Coding of Analog Signals by Methods Other Than PCM =32 kbit/s Adaptive Differential Pulse Code Modulation (ADPCM)" Malaga-Torremolinos, 1984, pp. 125 through 159.

"Embedded DPCM for Variable Bit Rate Transmission," David J. Goodman, *IEEE Transactions on Communications*, vol. COM-28, No. 7, Jul. 1980, pp. 1040-1046.

"An Integrated Voice/Data Network Architecture Using Virtual Circuit Switching", N. C. Huang, Globecom'85, IEEE Global Telecommunications Conference, Dec. 2-5, 1985 New Orleans, La., Conference Record vol. 2, pp. 542-546.

*Primary Examiner*—Douglas W. Olms
*Assistant Examiner*—Melvin Marcelo
*Attorney, Agent, or Firm*—Thomas Stafford

[57] ABSTRACT

In a speech signal being reconstructed from digital samples, artificial gaps caused by discarded late packets are minimized by holding state varibales constant in a decoder used to reconstruct the speech signal. The decoder state variables are held constant from the end of the last previous packet information field for up to a prescribed interval. Upon arrival of the "late" packet, the decoder passes from the hold variables state to its normal operating state and reading out of samples from the packet information field is initiated immediately. Subsequent packets in the information spurt are concatenated to the late arriving packet.

11 Claims, 28 Drawing Figures

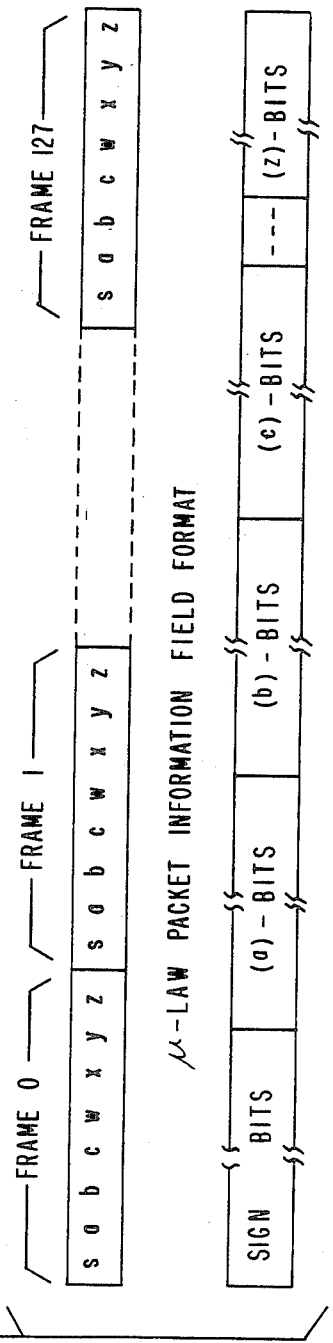
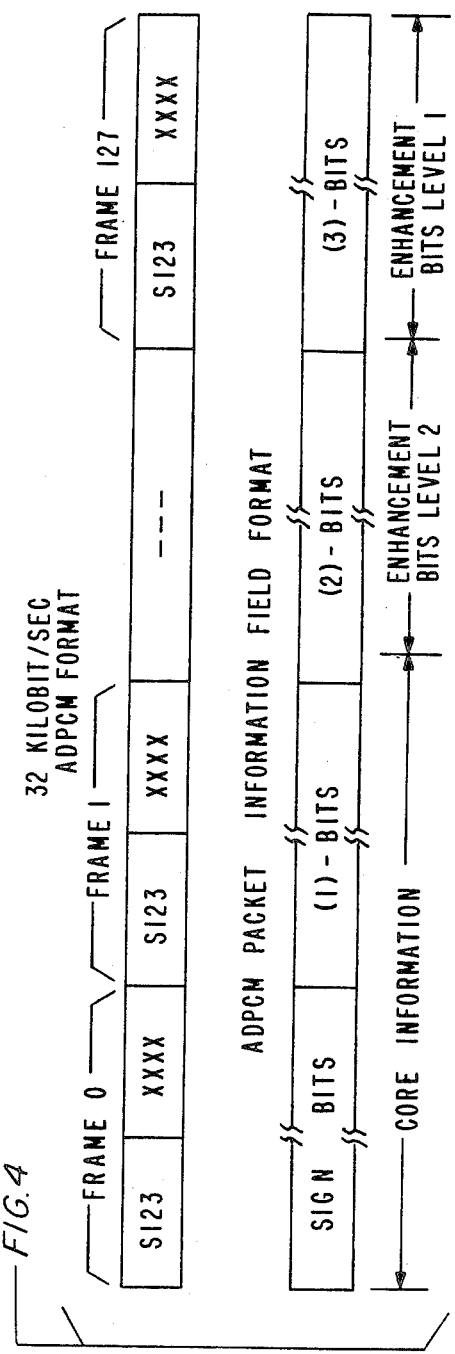
FIG. 3
FIG. 4

INPUT CONTROLLER 801

T1 = NO RESPONSE WAIT TIME
T2 = MAXIMUN PACKET SIZE WAIT TIME

OUTPUT CONTROLLER 803

TRANSMIT PROCESS MODULES 109
INPUT CONTROLLER 1102

TRANSMIT PROCESS MODULES 109
OUTPUT CONTROLLER 1106

SEQUENCE NUMBER PROCESSOR 1906

RECEIVE PACKET BUS SEQUENCER 1910

$t_g$ - PACKET GENERATION TIME
$t_r$ - PACKET RECEIVE TIME
$t_p$ - PACKET PLAYOUT TIME
$t_o$ - PACKET ORIGINATE INTERNAL
BLD - BUILDOUT DELAY

DIGITAL ENCODER AND DECODER SYNCHRONIZATION IN THE PRESENCE OF LATE ARRIVING PACKETS

RELATED APPLICATIONS

U.S. patent application Ser. Nos. 834,904, 834,617, 834,612, 834,615, and 834,910 were filed concurrently herewith.

TECHNICAL FIELD

This invention relates to voice packet systems and, more particularly, to voice packet timing recovery.

BACKGROUND OF THE INVENTION

In a voice packet transmission system, packets experience varying delays which depend on the transmission load at switching and multiplexing nodes and the number of such nodes in the packet transmission path. Heretofore, individual packets which experienced a delay greater than the so-called "normal" delay were considered late packets and were simply discarded. The discarding of such late packets causes distortion in a decoder which is attempting to reconstruct a replica of the transmitted speech signal. The distortion may be in the form of so-called clicks and pops in the reconstructed speech signal. This is extremely annoying and undesirable.

SUMMARY OF THE INVENTION

The problems resulting from discarding so-called late arriving packets are overcome, in accordance with an aspect of the invention, by holding the state variables of a decoder constant for up to a first prescribed interval beginning from the end of reading out of the information field samples of the last previous packet. If a particular packet is determined to be late arriving, the decoder passes from the holding state to its normal operational state and reading out of samples from the late arriving packet information field is initiated immediately. subsequent received packets in the same information spurt are concatenated to the late arriving packet. A packet is determined to be late arriving if it is received after a second prescribed interval has elapsed from the end of reading out of the information field samples of the last previous packet.

Additionally, the state variables of the decoder and a corresponding encoder are initialized to predetermined values for so-called "initial" packets. An initial packet is one that is received after the first prescribed interval has elapsed after the end of reading out of the samples from the last previous packet information field.

The first prescribed interval is longer than the second prescribed interval, so that late packets will not arrive during the decoder initialization state.

BRIEF DESCRIPTION OF THE DRAWING

The invention will be more fully understood from the follwing detailed description of an illustrative embodiment taken in connection with the appended figures in which:

FIG. 3 illustrates a μ-law PCM signal format and a corresponding packet information field format useful in describing the invention;

FIG. 4 illustrates a 32-kilobit/s ADPCM signal format and a corresponding packet information field format in accordance with an aspect of the invention;

DETAILED DESCRIPTION

General Description

Figure 1:
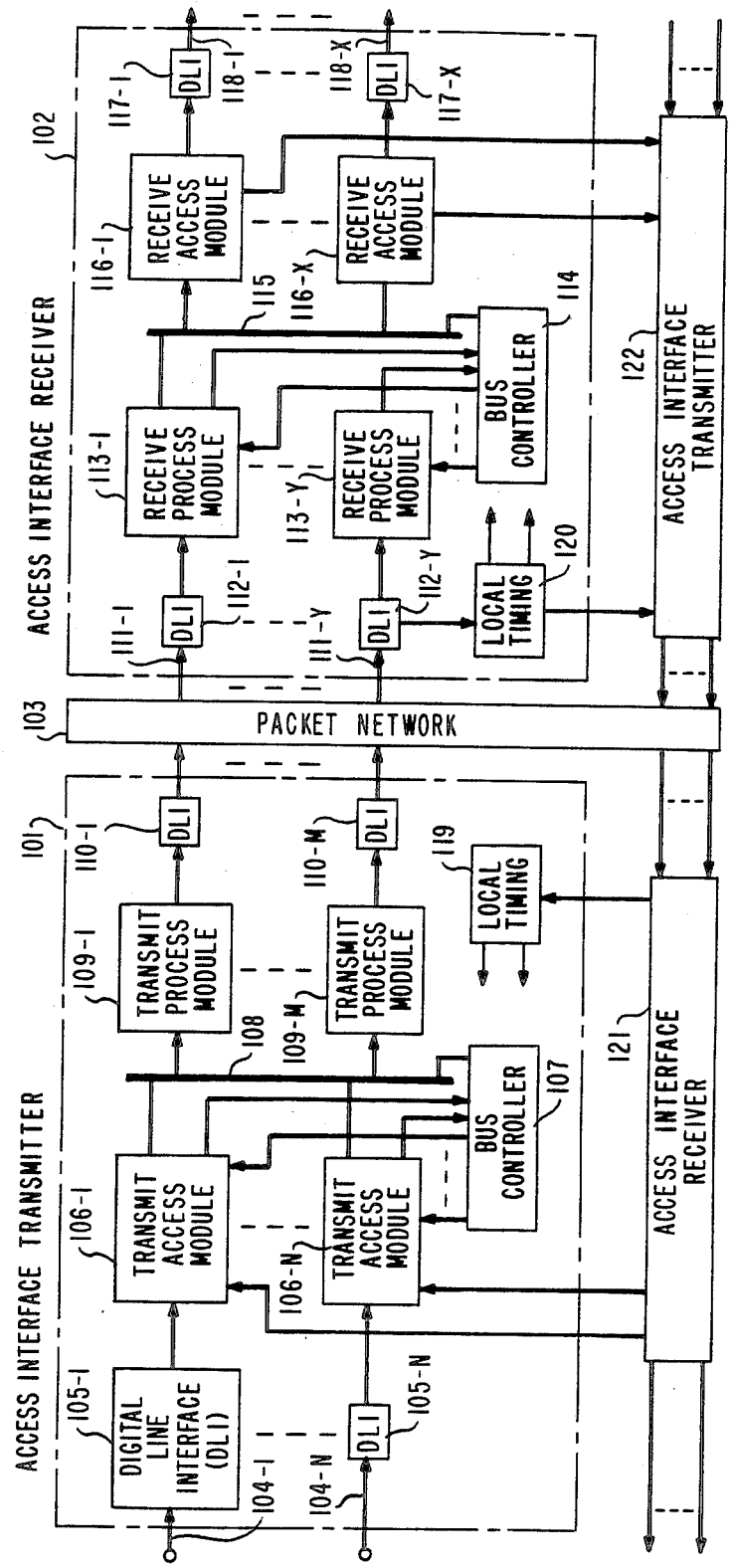
FIG. 1 shows a packet network including access interface transmitters and receivers including an embodiment of the invention.

FIG. 1 shows in simplified block diagram form an interface for accessing a packet network from a plurality of digital lines. The signals on the digital lines may include voice, digital data, voiceband data and the like, i.e. any of the signals transmitted, in this example, in the DS1 format. Accordingly, shown are access interface transmitter 101 and access interface receiver 102 which interface with packet network 103. It will be apparent to those skilled in the art that in practice an access interface receiver 121, essentially identical to receiver 102, is associated or otherwise co-located with each access interface transmitter 101 and an access interface transmitter 122, essentially identical to transmitter 101, is associated or otherwise co-located with each access interface receiver 102. Although only an end-to-end arrangement is shown, it will be apparent that a packet network may include numerous nodes through which packets will be transmitted and/or switched prior to being received at a particular access interface receiver.

Access interface transmitter 101 receives on transmission lines 104-1 through 104-N digital signals in, for example, a standard DS1 format including voice, voiceband data and the like and converts those signals into packets for transmission. A plurality of time division multiplexed signals are supplied by input terminals 104-1 through 104-N to digital line interface units (DLI) 105-1 through 105-N in access interface transmitter 101. The digital line interface units 105 are each of a type well known in the art for interfacing DS1 digital signals. Such digital line interface units include a phase locked loop for recovering the DS1 clock signal of 1.544 Mb/sec, a bipolar-to-unipolar converter, an equilizer for the equilization of gain and/or delay distortion, performance monitoring apparatus, provision for DS1 loopback maintenance and apparatus for reformatting the unipolar digital signals from the 24 channel format into a 32 time slot PCM format having a first transmission rate, in this example, of 2.048 Mb/sec synchronous with the access interface internal timing. Although only 24 time slots are used to transmit data in this example, it will be apparent that all 32 time slots may be employed in other arrangements. The 32 time slot PCM output signals from DLIs 105-1 through 105-N are supplied to transmit access modules 106-1 through 106-N, respectively. Each of transmit access modules 106 converts the 32 time slot PCM signals at the first transmission rate from associated ones of DLIs 105-1 through 105-N into a packet format in a manner as will be described below. Bus controller 107 interacts with each of transmit access modules 106-1 through 106-N and transmit packet bus 108 to control supplying packet outputs from transmit access modules 106 to transmit packet bus 108. The packets supplied to transmit packet bus 108 from each of transmit access modules 106-1 through 106-N include an internal destination code that indentifies one of the transmit process modules 109-1 through 109-M in which the particular packet is intended to be processed. Transmit packet 108 has a processing rate, in this example, of 8.192 Mb/s. It should be noted that the number M of transmit process modules 109 may be more or less than the number N of transmit access modules 106.

Each transmit process modules (109-1 through 109-M) monitors transmit packet bus 108 to detect and obtain individual packets assigned to it. Each of transmit process modules 109 further processes its assigned packets to complete the packet header field and to provide buffering to realize a uniform output rate. Details of transmit process modules 109 are further described below. The packet outputs from transmit process modules 109-1 through 109-M are supplied to digital line interface (DLI) units 110-1 through 110-M, respectively. The DLI units 110-1 through 110-M each converts the packetized information into a digital output signal format. In this example, the digital output signal comprises the known extended PCM framing format wherein each frame includes 193 bits and is transmitted at the 1.544 Mb/s rate. Such line interface units are known in the art. The packetized DS1 formatted signals, including the packets of information, are supplied from DLI units 110-1 through 110-M to packet network 103. Packet network 103 may be any of those known in the art. See, for example, U.S. Pat. No. 4,494,230, issued Jan. 15, 1985 to J. S. Turner, for one example of a preferred packet switching network. The packetized DS1 signals are transmitted as desired to any number of remote access interface reciever units 102. Timing signals for the access interface transmitter 101 are derived from a corresponding access interface receiver 121 co-located with the transmitter 101 for use in well-known fashion as desired. Local timing unit 119 generates the local timing signals used in operating the modules in transmitting 101. The clock signal from which the local timing signals are derived is obtained from co-located access interface receiver 121 and will be described in relationship to access interface receiver 102.

Access interface receiver 102 receives on transmission lines 111-1 through 111-Y packetized digital signals in a DS1 extended framing format from packet network 103 and converts those packatized digital signals to the standard DS1 format including voice, voiceband data and the like. It is again noted that a particular access interface receiver 102 may receive packets from one or more access interface transmitters 101 and the number Y of receive transmission lines may vary from receiver to receiver. To this end, the packetized signals are supplied via DS1 level transmission lines 111-1 through 111-Y to digital line interface (DLI) units 112-1 through 112-Y, respectively. Digital line interface units 112 are again of a type well known in the art which convert the bipolar DS1 packetized signals into unipolar digital signals, reformats the unipolar digital signals into a 32 time slot unipolar format having a transmission rate, in this example, of 2.048 Mb/sec, and recovers the DS1 clock signal, etc. The recovered clock signal is employed in well-known fashion to generate the so-called local timing signals in local timing unit 120 that are used in access interface receiver 102 and in a co-located access interface transmitter 122. Access interface transmitter 122 is essentially identical to access interface transmitter 101. The 32 time slot unipolar packetized signals are supplied from each of DLIs 112-1 through 112-Y to receive process modules 113-1 through 113-Y, respectively. Each of receive process modules 113-1 through 113-Y converts the incoming 32 time slot packetized signals from a first transmission rate into an internal processing rate emloyed by receive packet bus 115. In this example, the first transmission rate is the 2.048 Mb/sec 32 time slot format rate and the internal receive packet bus 115 rate is 8.192 Mb/sec. Receive process modules 113 also pre-process the received packets. For example, the pre-processing includes adding an internal receive destination code field, processing time stamp information, monitoring for transmission errors and dropping any packets which have incurred such errors in their headers. Bus controller 114 interacts with each of receive process modules 113-1 through 113-Y and receive packet bus 115 to control the flow of packets onto receive packet bus 115. Receive access modules 116-1 through 116-X each monitors activity on receive packet bus 115 to detect packets assigned to it via the receive destination code in the packet header. Receive access moduels 116-1 through 116-X reconstruct a facsimile of the original signals applied to transmit access moduels 106-1 through 106-N from one or more remote access interface transmitters 101. Outputs from each of receive access modules 116-1 through 116-X are 32 time slot time division multiplexed signals which are supplied to digital line interface units 117-1 through 117-X. Each of digital line interface units 117-1 through 117-X converts a unipolar 32 timeslot time division multiplexed signal having a rate of 2.048 Mb/sec into a standard DS1 PCM format having a rate of 1.544 Mb/sec for transmission as desired over associated digital transmission lines 118-1 through 118-X, respectively. It is noted that the number Y of receive process modules 113 may be more or less than the number X of receive access modules 116.

For simplicity and clarity of desription, the following description of the modules of the transmitter 101 and receiver 102 is on a per time slot basis. It will be apparent to those skilled in the art that the modules are time-shared to process the 32 time slots of the internal signals.

Transmit Access Module

Figure 2:
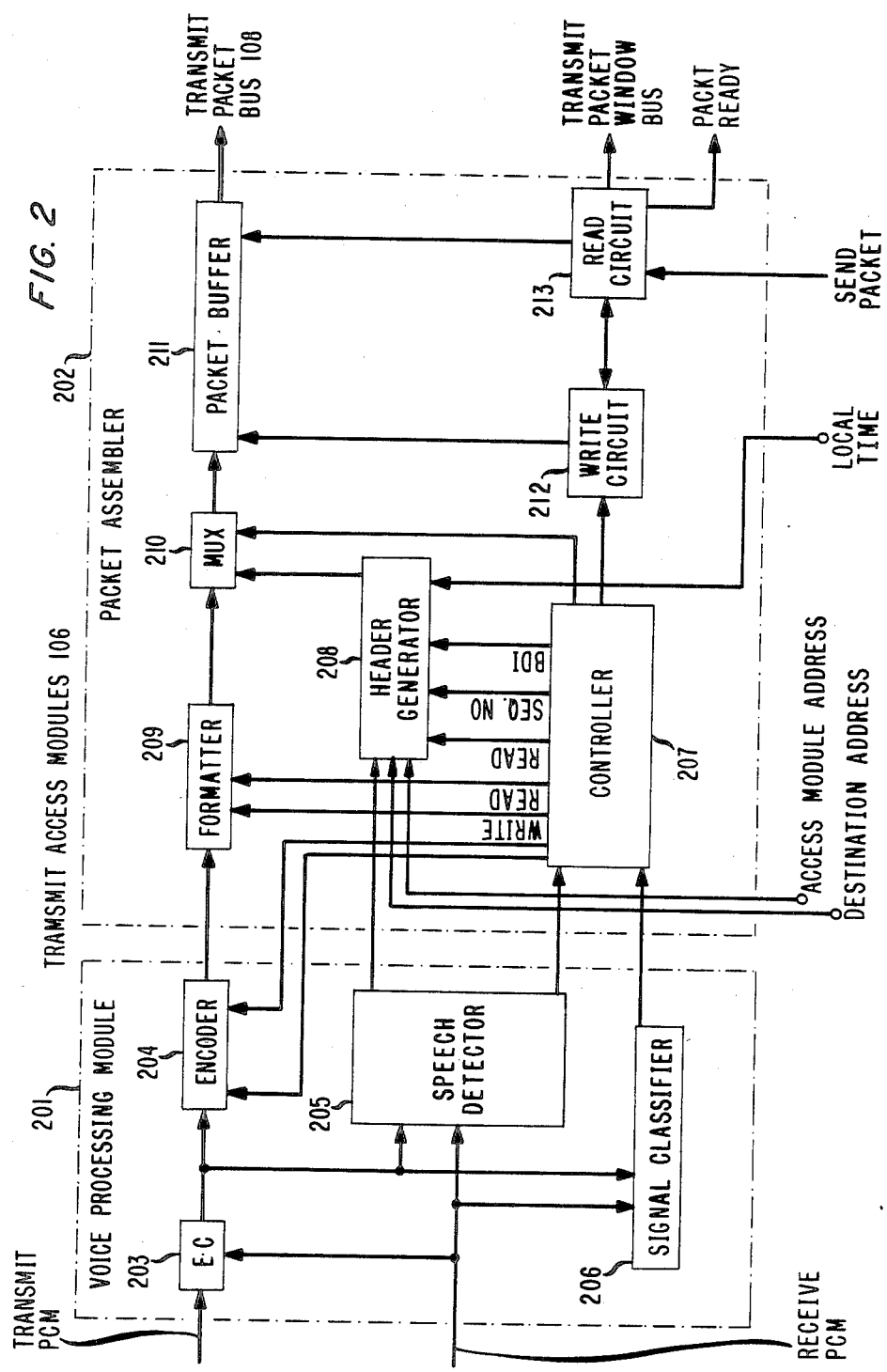
FIG. 2 depicts details of transmit access modules 106 employed in the access interface transmitter 101 of FIG. 1.

FIG. 2 shows in Simplified block diagram form details of transmit access modules 106. Each of transmit access modules 106 includes a voice processing module 201 and a packet assembler 202. Voice processing module 201 includes echo canceler 203, encoder 204, speech detector 205 and signal classifier 206. Voice processing module 201 is employed to encode voice band signals on a time slot by time slot basis including speech and voiceband data into an ADPCM encoded output signal which is supplied to packet assembler 202. During time slots which are assigned to digital data signals, voice processing module 201 becomes transparent and those signals are supplied directly to packet assembler 202 without any voice signal processing in a well known manner (not shown). In processing the voice band signals, echo canceler 203 is supplied with the 32 time slot transmit PCM signal from an associated one of digital line interfaces 105 (FIG. 1) and with a receive PCM signal from co-located access interface receiver 121 (FIG. 1) to cancel echos in well-known fashion. The receive PCM signal is specifically obtained from an associated one of receive access modules in the co-located access interface receiver 121. Such echo canceler units are well known in the art. See, for example, U.S. Pat. No. 3,500,000, and an article entitled "A Single-Chip VLSI Echo Canceler", by D. L. Duttweiler at al, BSTJ, Vol. 59, No. 2, February 1980, pages 149–160.

Speech detector 205 is supplied with the output from echo canceler 203 and the receive PCM signal from the associated access interface receiver 121 (FIG. 1). Speech detector 205 detects the presence of voiceband energy in each time slot of the 32 time slots of the transmit PCM signals supplied to it. Speech detector 205 generates an active-inactive output for each of the time slots of the transmit PCM signal which is supplied to controller 206 and a noise estimate value which is supplied to header generator 208 in packet assembler 202. Such speech detector arrangements are known in the art. See, for example, U.S. Pat. No. 4,277,645, issued to C. J. May, Jr., on July 7, 1981.

Signal classifier 206 is also supplied with the output signal from echo canceler 203 an the receive PCM signal from the associated access interface receiver and classifies the signals in the transmit PCM time slots as being voice or nonvoice signals. The voice-nonvoice output indication from signal classifier 206 is supplied on a per time slot basis to controller 207 in packet assember 202. Such signal classifier arrangements are also well known in the art. See, for example, U.S. Pat. No. 4,281,218, issued to Chin-Sheng Chuang et al on July 28, 1981.

Figure 25:
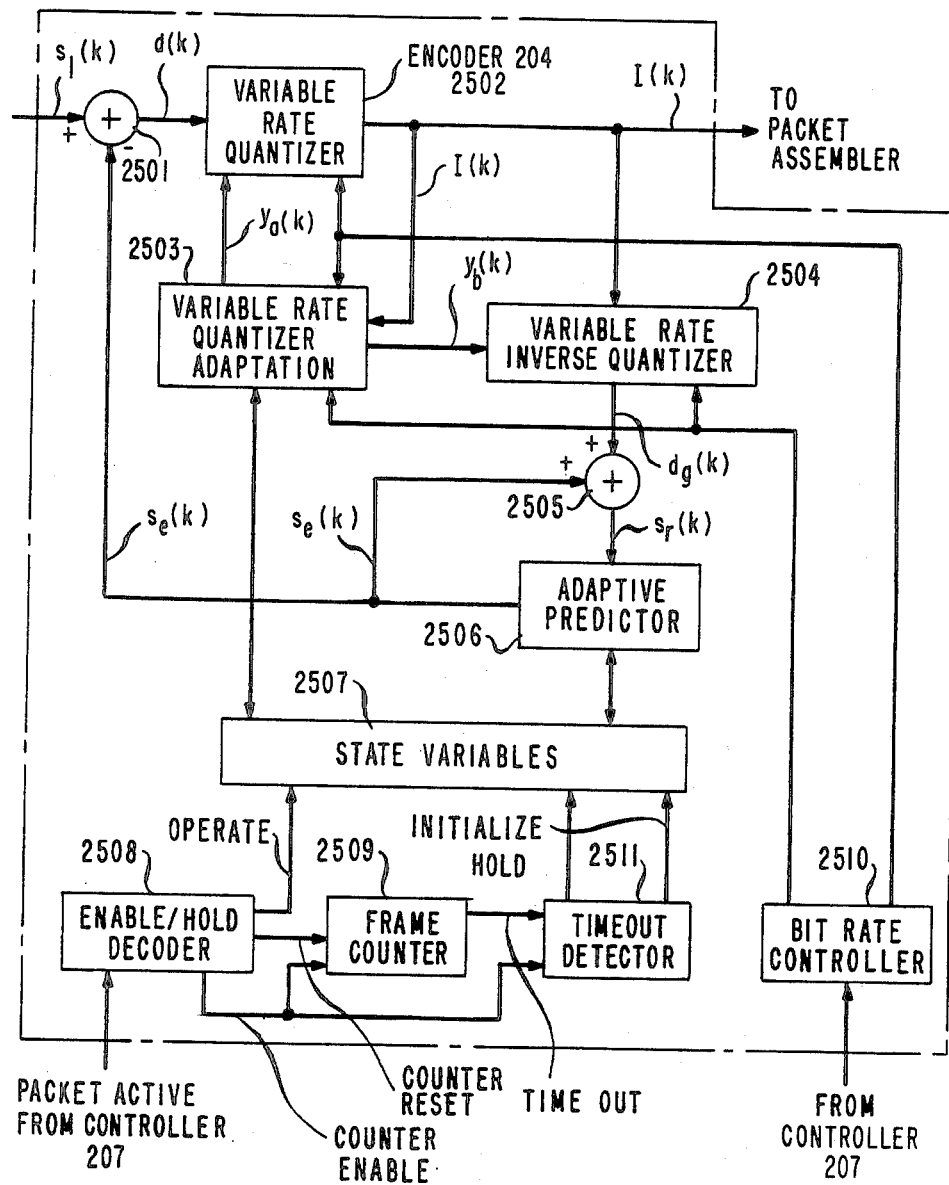
FIG. 25 shows in simplified block diagram form details of encoder 204 used in transmit access modules 106 of FIG. 2.

Encoder 204 is a variable rate encoder for converting the transmit PCM signals into ADPCM output signals. Controller 207 supplies a packet active control signal, and an encoding rate and type of coding control signal to encoder 204. The encoding rate may be one of a plurality of rates selected as desired depending on the network configuration for the particular time slot in the PCM signal and upon the signal classifier output. The packet active control signal is useful to facilitate for handling late-arriving packets and for recovering from packet loss and transmission errors in an associated remote access interface receiver in accordance with an aspect of the invention. In encoder 204 the packet active signal is employed to control initialization, adaptation and holding of its state variables. Details of encoder 204 are shown in FIG. 25 and described below in conjunction with the state diagram of FIG. 26.

The ADPCM output from encoder 204 is supplied to formatter 209 in packet assembler 202. Formatter 209 includes, in this example, a RAM memory unit and a plurality of counters (not shown) which perform a shift register function for the purpose of rearranging the supplied bits into a packet information field format as shown in FIGS. 3 and 4 for the $\mu$-law PCM signal format and for the 32 kilobit/sec ADPCM signal format, respectively. It should be noted that FIGS. 3 and 4 depict the formats for an individual time slot, for example, time slot zero, and are repeated for the remaining time slots 1 through 31 in each frame of the PCM transmit signals. Specifically, formatter 209 performs the function of grouping in a prescribed manner the individual bits of each time slot into the packet information field for that time slot, in accordance with an aspect of the invention. The grouping of the bits is such as to facilitate processing of the packet information field, in accordance with an aspect of the invention. It is noted that the grouping of the bits is readily realized by an addressing scheme of the RAM memory unit memory locations. For example, the bits of the $\mu$-law PCM or the ADPCM samples can be written into the RAM memory locations in parallel for a predetermined number of repetitive frames and then the "groups" of bits are formed from the predetermined number of frames by reading them out in series beginning with the group of most significant bits to the group including the least significant bits of the samples from the predetermined number of frames. Thus, as shown in FIG. 3, for μ-law PCM signals there are eight bits per time slot and 128 frames are included in a packet interval. In this example, a packet interval is 16 milliseconds. Then, the sign(s) bits for a particular time slot from the 128 frames are grouped together in 128 bit positions in the RAM memory of formatter 209. The (a) bits from the 128 frames for the particular time slot are grouped together, also in 128 bit positions of the RAM memory, and so on through the (z) bits. The groups of bits from the 128 frames for the time slot form the packet information field which is outputted to multiplexer 210.

For the 32 kbit/sec ADPCM format, the time slot includes four bits, namely, s, 1, 2 and 3, and four so-called don't care bits denoted by the character x. Thus, the 128 sign bits are grouped together in bit positions of the RAM memory in formatter 20. The 128 (1)-bits are also grouped together in bit positions of the RAM memory as are the 128 (2)-bits and 128 (3)-bits. As indicated in FIG. 4, the (3)-bits are considered enhancement bits level 1, and the (2)-bits are the enhancemet bits level 2. These level 1 and level 2 enhancement bits are the groups of bits which are controllably droppable, that is, they can be removed from voice packets as desired, in accordance with an aspect of the invention, as will be explained later. In addition to the 4-bit ADPCM sample, the system configuration may call for a 3-bit ADPCM sample transmission or a 2-bit ADPCM sample transmission in a particular time slot. For 3-bit ADPCM, only the s, 1 and 2 bits are used and for 2-bit ADPCM, only the s and 1bits are used. It is noted that this packet information field is formed for each of the 32 time slots in the incoming signal. That is to say, a packet information field is formed for each of the time slots and, hence, for each of the channels being transmitted. The writing-in of data to and the reading-out of the packet information fields from formatter 209 is controlled by controller 207 as explained below. The packet information field output from formatter 209 is supplied to multiplexer 210 where it is combined with an appropriate packet header from header generator 208.

Figure 5:
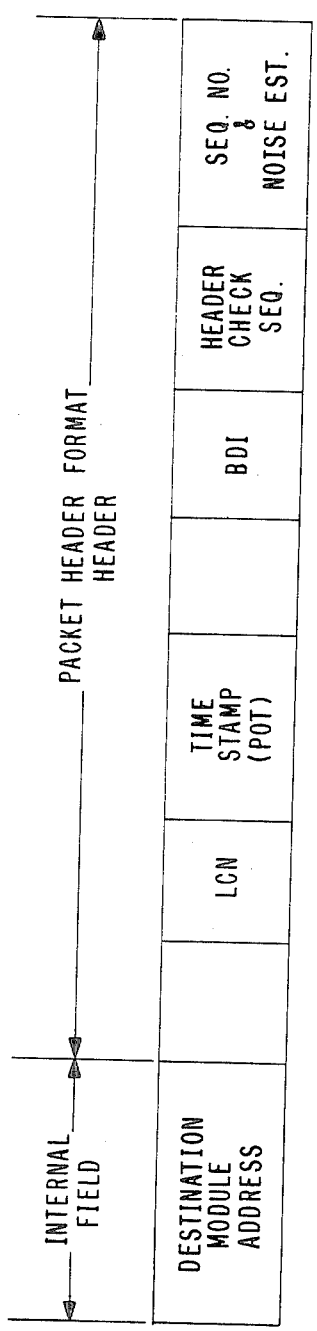
FIG. 5 depicts a packet header format useful in describing the invention.

Header generator 208 is operative to generate the packet header as shown in FIG. 5 on a per-packet basis under control of controller 207. Header generator 208 includes memory for storing the desired header fields. The packet header fields include an internal field which has an internal destination code that identifies the one of transmit process modules 109 (FIG. 1) that will process the packet for transmission to a remote access interface receiver. The internal destination module code is discarded in the transmit process module prior to transmission. Another field is the logical channel number (LCN) which identifies where in the transmission system the packet is to be transmitted. The time stamp field includes the local time at which the packet was originated, namely, the packet originate time (POT), and is obtained from a local time signal from local timing unit 119 (FIG. 1). In this example, the local time rate is 1 kHz. The BDI field includes information that is used to select the type of processing for the packet and is used to indicate the type of packet that has been generated. It is again noted that for digital data and voice band data none of the bits are droppable. In the access interface transmitter 101, the BDI for the particular time slot is obtained from the particular system configuration stored in controller 207. The BDI field includes two subfields, one contains the type of coding which is being used for the particular packet (receive status) and the other contains information concerning previous processing of the packet, e.g., whether any of the enhancement fields have been dropped (packet length value). The sequence number (SEQ.No.) field includes the initial packet identifier, if the packet happens to be the first packet occurring after a period of silence, or the packet virutal sequence number if it is a subsequent one of consecutive packets. The use of the virtual sequence number scheme is described below. The noise estimate field includes the background noise estimate value generated by speech detector 205. A check sequence is calculated over the entire packet header for insertion into a header check sequence field. These header field signals are loaded into the header generator 208 under control of controller 207. The header is supplied to multiplexer 210 where it is combined with the packet information field and, subsequently, written into packet buffer 211. The writing into packet buffer 211 is also under control of controller 207 in conjunction with write circuit 212. The packets in packet buffer 211 are read out to transmit packet bus 108 (FIG. 1) under control of read circuit 213 and ubs controller 107 (FIG. 1). Read circuit 213 sends a packet ready signal to bus controller 107 and when bus controller 107 transmits a send packet signal, read circuit 213 causes the packet to be read from packet buffer 211 to transmit packet bus 108. Operation of bus controller 107 is described below.

Controller 207 controls the operation of encoder 204 and packet assembler 202. To this end, controller 207 includes control logic and a plurality of packet interval timers, one for each time slot (not shown) for effecting a sequence of control steps in generating a packet in assembler 202 and for controlling the encoder 204. Again, in this example, the packet interval is 16 milliseconds.

Figure 6:
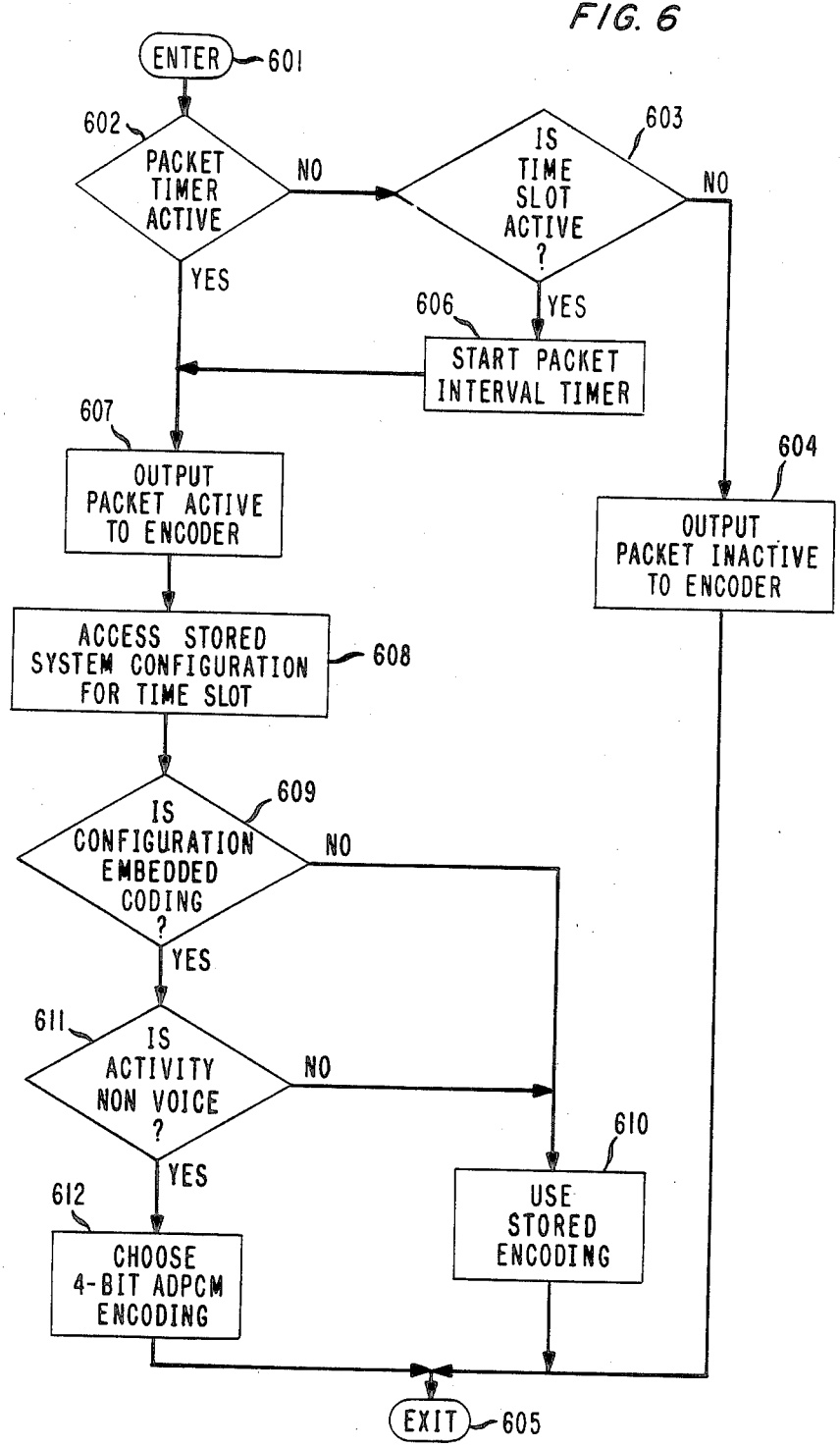
FIG. 6 is a flow chart illustrating a sequence of operations effected in controller 207 in controlling encoder 204 of FIG. 2.

FIG. 6 is a flow chart showing a sequence of steps which are effected in controller 207 in controlling the configuration and operation of encoder 204 (FIG. 2). Accordingly, the sequence is entered for each time slot of a recurring frame via 601. Thereafter conditional branch point 602 tests to determine whether a packet is active according to the output from speech detector 205. If the test result in step 602 is NO, conditional branch point 603 test to determine if the present time slot is active. The activity is sensed by interrogating the state of the output from speech detector 205. If the test result in step 603 is NO, operational block 604 causes controller 207 to output a packet inactive (false) signal which is supplied to encoder 204 (FIG. 2) and the encoder control sequence is exited via 605. That is to say, encoder 204 is disabled during time slot intervals that both the packet and time slot are determined to be inactive. If the test result in step 603 is YES, the time slot is active and operational block 606 causes a packet interval timer (not shown) in controller 207 to start counting the packet interval. This indicates the beginning of a packet since the packet indication in step 602 was inactive and now the time slot as indicated in step 603 is active. Consequently, this is the first time slot in a packet. thereafter, control is transferred to operational block 607 which causes controller 207 to output a packet active (true) signal. The packet active signal is supplied from controller 207 to enable encoder 204 (FIG. 2). Returning to step 602, if the test result is YES, the packet remains active and operational block 607 causes the packet active signal to be supplied from controller 207 to encoder 204. Operational block 608 causes the stored system configuration, i.e., the type of coding, for the present time slot to be accessed. Conditional branch point 609 tests the system configuration for the present time slot to determine if the encoding is so-called embedded coding. The embedded coding scheme is known in the art. See, for example, U.S. Pat. No. 3,781,685 issued Dec. 25, 1973, and an article by David J. Goodman "Embedded DPCM for Variable Bit Rate Transmission", *IEEE Transactions On Communications,* Vol. Com-28, No. 7, July 1980, pages 1040–1046. If the test result in step 609 is NO, the type of coding is not embedded and operational block 610 causes the encoding stored in the system configuration in controller 207 to be employed, i.e., for example, bypass encoder 204 if digital data is being transmitted, 4-bit ADPCM, 3-bit ADPCM or 2-bit ADPCM coding. Thereafter, the sequence is exited via 605. If the test result in step 609 is YES, the coding is embedded and conditional branch point 611 tests to determine whether the transmission activity is nonvoice. If the test result in step 611 is NO, i.e., the activity is voice, and operational block 610 causes the stored encoder configuration to be used and the sequence is thereafter exited via 605. If the test result in step 611 is YES, the activity is nonvoice, i.e., for example, voiceband data, and operating block 612 causes a premium transmission quality to be provided to this channel, i.e., time slot. In this example, 4-bit ADPCM encoding to be used. Thereafter, the sequence is exited via 605. The stored encoder configurations are, for example, 4-bit, 3-bit or 2-bit embedded coding ADPCM, and 4-bit, 3-bit or 2-bit non-embedded coding ADPCM. In for example a 4/2-bit embedded coding arrangement two of the four bits are so-called core bits and cannot be dropped, only the two least significant bits can be dropped. Similarly, in a 4/3 embedded coding arrangement, three of the bits are core bits and only the least significant bit can be dropped.

Figure 7:
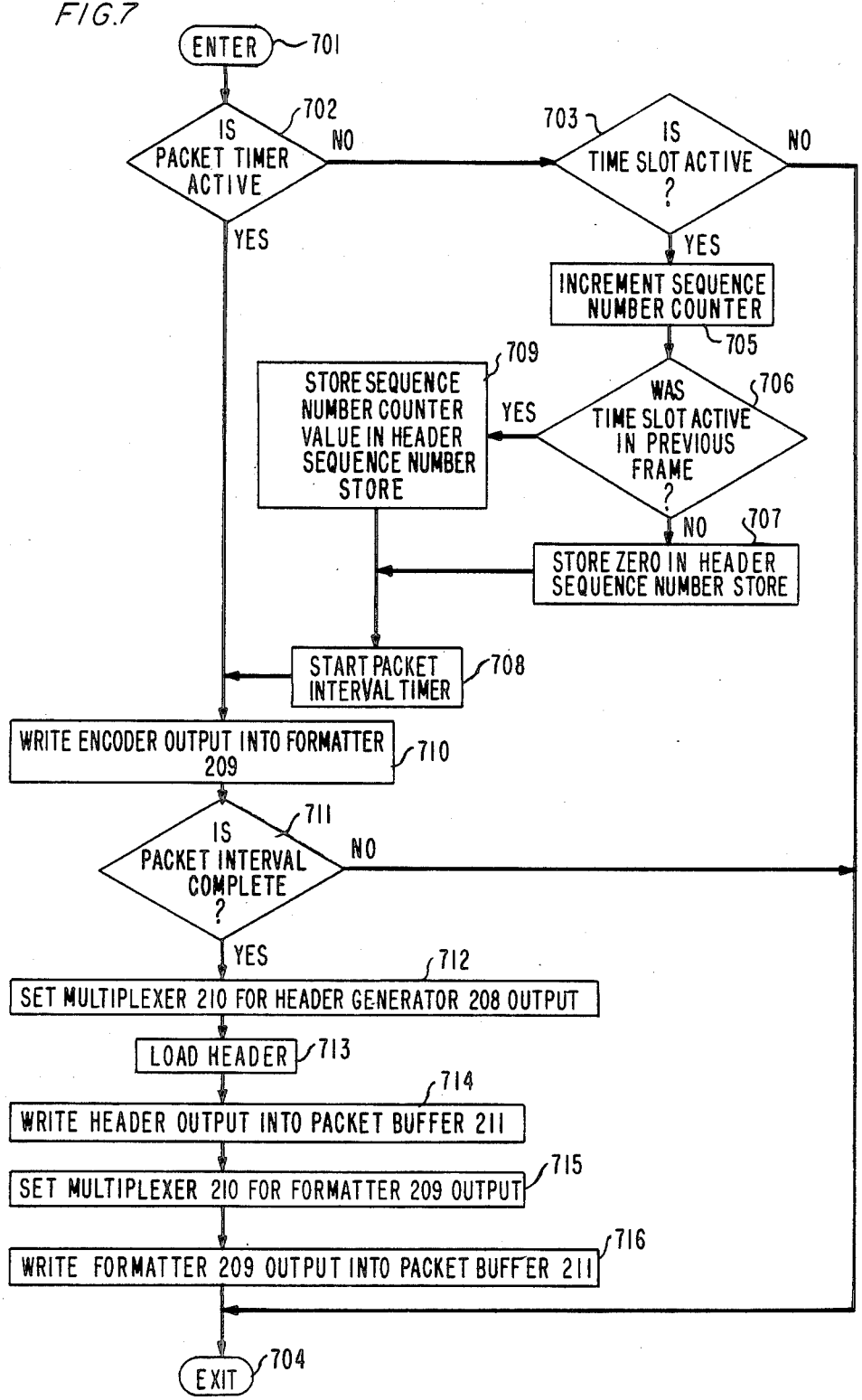
FIG. 7 is a flow chart illustrating another sequence of operations effected in controller 207 in controlling packet assembler 202 of FIG. 2.

FIG. 7 is a flow chart of a sequence of operations effected by controller 207 in controlling packet assembler 202 (FIG. 2) to generate a packet which is to be supplied to transmit packet bus 108 (FIG. 1) in access interface transmitter 101. Accordingly, the sequence is entered for each time slot of a recurring frame via 701. Thereafter, conditional branch point 702 tests to determine whether the packet is active. If the test result of step 702 is NO, conditional branch point 703 tests to determine whether the time slot is active. If the test result in step 703 is NO, the sequence is exited via 704. That is to say, there is no packet to be presently generated for this particular time slot. If the test result of step 703 is YES, operational block 705 causes a packet sequence number counter to be incremented. This is done because step 702 yielding a NO test result and step 703 yielding a YES test result indicate the start of a new packet. It should be noted that the sequence number counter, in this example, is a modulo 15 counter, i.e., it counts 1–15 continuously. There is no zero state. The zero (0) state is used instead of a flag for identifying the initial packet in a spurt of contiguous packets. A particular packet sequence may be, for example, 0, 5, 6, 7, 8, . . . , 15, 1, 2, 3, 4, 5, . . . . Another sequence may be 0, 14, 15, 1, 2, . . . , 12, 13, 14, 15, 1, . . . . Such sequences are known as virtual sequences. The zero is inserted to indicate the initial or scheduled packet in a speech or information spurt. It is noted that the number in the virtual sequence is incremented for each packet in the information spurt including the first packet. Thus, the unique number identifying the initial packet in the information spurt replaces a number in the virtual sequence, as shown above. The virtual sequence numbering of the packets in an information spurt simplifies, in accordance with an aspect of the invention, the reconstruction of the digital signals in an associated remote access interface receiver 102. Conditional branch point 706 tests to determine whether this particular time slot was active in the last previous frame. If the test result in step 706 is NO, operational block 707 causes a zero (0) to be stored in the header generator 208 (FIG. 2) sequence number store. This indicates the start of a new sequence of packets in the information spurt. Thereafter, operational block 708 causes the packet interval timer to begin timing the packet interval. It should be noted that this packet interval timer is synchronous with the packet interval timer of step 606 of FIG. 6. Returning to step 706, if the test result is YES, the packet is another in the current information spurt and operational block 709 causes the current sequence number counter value to be stored in the sequence number store in header generator 208 (FIG. 2). Thereafter, operational block 708 causes the packet interval timer to start timing the packet interval. then, operational block 710 causes the output sample from encoder 204 (FIG. 2) for the current time slot to be written into formatter 209.

Returning to step 702, if the test result is YES, the currentpacket is still active and operational block 710 causes the output sample from encoder 204 (FIG. 2) for the current time slot to be written into formatter 209 (FIG. 2).

Conditional branch point 711 tests to determine if the current packet interval is complete. Again, in this examaple, the packet interval is 16 milliseconds. if the test result of step 711 is NO, the packet information field is not yet completed and the sequence is exited via 704. If the test result in step 711 is YES, the packet is complete and ready to be assembled. Operational block 712 causes the multiplexer 210 (FIG. 2) to be set for the header output from header generator 208 (FIG. 2). Operational block 713 causes the header information to be loaded into the stores in header generator 208. That is to say, the internal destination field, the noise estimate, the BDI, the sequence number (SEQ.No.), the logical channel number (LCN) and the time stamp (TS) fields are loaded into the header stores in header generator 208 (FIG. 2). The packet originate time (POT) is inserted into the TS field. It is noted that POT=LTA−TS. That is, the POT is the packet arrival time LTA, i.e., the local time at which the packet arrives at a node, less the TS value in the time stamp field of the arriving packet. If the packet is being originated at this node, i.e., access interface transmitter, then TS=0. It is important to note that the same local time signal is used in all modules in a node. This use of the same local time signal in conjunction with using the packet arrival time LTA at and packet departure time LTD from a node to compute the time stamp value simplifies the time stamp computation and allows use of only one time stamp field in the packet header, in accordance with an aspect of the invention. Operational block 714 causes the header fields (FIG. 5) to be written via multiplexer 210 into packet buffer 211 (FIG. 2). Operational block 715 causes multiplexer 210 to be set for the formatter 209 output. This output is the packet information field which follows the packet header. Operational block 716 causes the packet information field from formatter 209 to be written via multiplexer 210 into packet buffer 211. Consequently, the completed packet is now stored in packet buffer 211. Thereafter, the sequence is exited via 704.

Bus Controller

Figure 8:
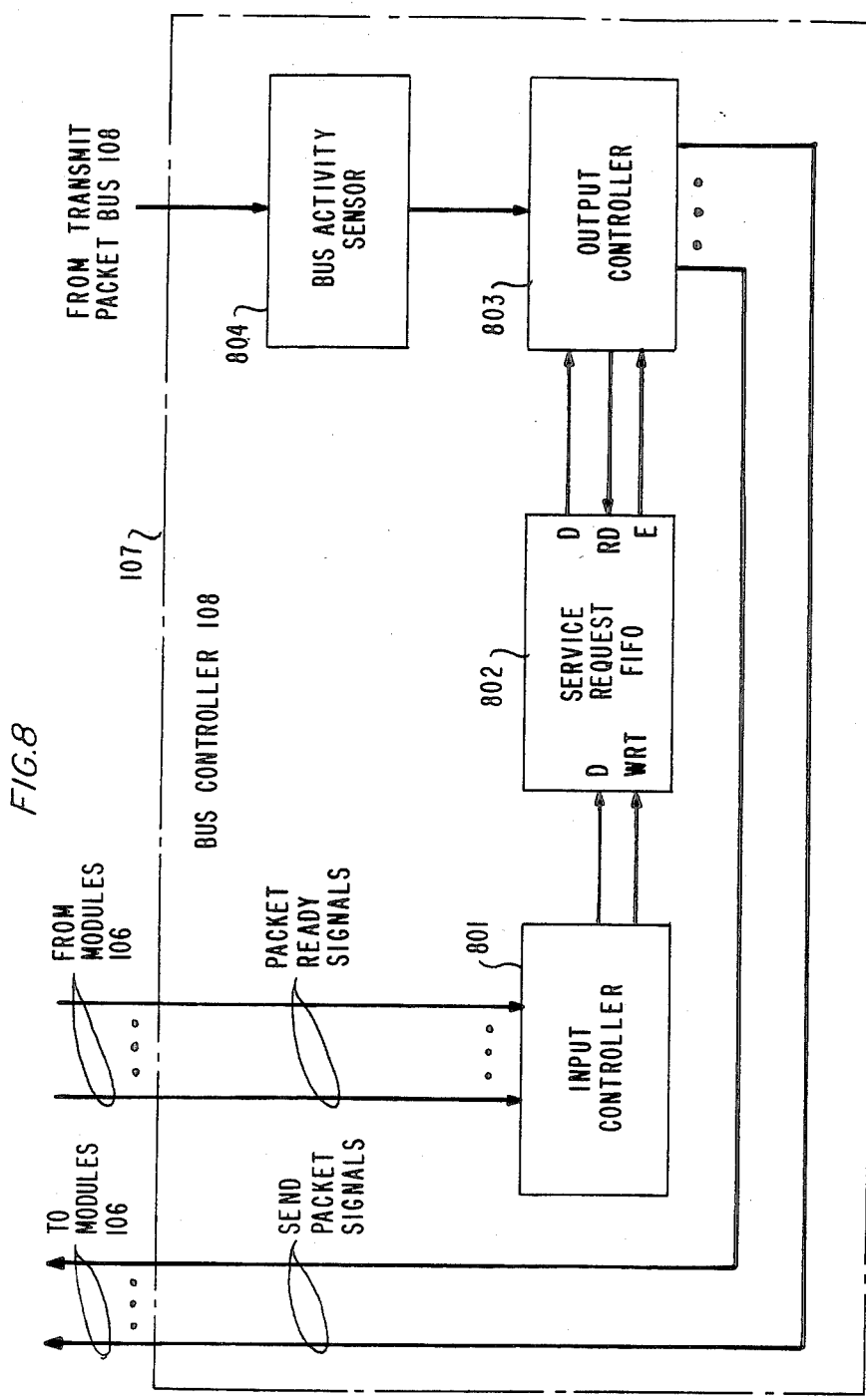
FIG. 8 shows in simplified block diagram form details of bus controller 107 of FIG. 1.

FIG. 8 shows in simplified block diagram form details of bus controller 107 of FIG. 1. It is noted that bus controller 107 employed in access interface transmitter 101 interfaces with each of transmit access modules 106-1 through 106-N and transmit packet bus 108. Bus controller 114 employed in access interface receiver 102 is essentially identical to bus controller 107. Bus controller 114 differs from bus controller 107 in that it is employed in access interface receiver 102 to interface with each of receive process modules 113-1 through 113-Y and receive packet bus 115. Accordingly, only bus controller 107 will be described in detail, since the operation of bus controller 114 will be apparent therefrom to those skilled in the art. The bus controller 107 includes input controller 801, service request FIFO 802, i.e., a first in-first out type of buffer storage unit, output controller 803 and bus activity sensor 804. Input controller 801 includes combinational logic for the polling of the packet ready requests from the transmit access modules 106-1 to 106-N and the conversion of these requests into the transmit access module address for storage in the service request FIFO 802.

Figure 9:
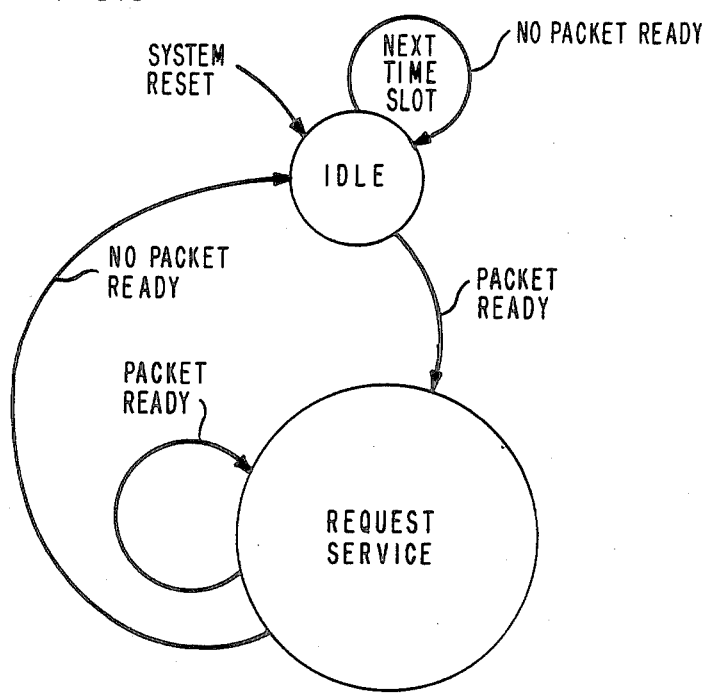
FIG. 9 depicts a state diagram illustrating operations effected in input controller 801 in bus controller 107 of FIG. 8.

FIG. 9 shows a detailed state diagram of the operation of input controller 801 (FIG. 8). The state diagram consists of two states, an IDLE state and a REQUEST SERVICE state, in which a service request is stored in service request FIFO 802. At system reset, the system enters the IDLE state and remains in the IDLE state until there is a packet reqdy request signal from one of transmit access modules 106 (FIG. 2). When the packet ready request signal is received from any of transmit access modules 106, control passes to the REQUEST SERVICE state, and the packet ready service request is stored in serivce request FIFO 802. When there is no longer a packet ready service request signal, input controller 801 returns to the IDLE state. However, if there is another packet waiting, indicated by a packet ready service request, bus controller 107 passes back into the REQUEST SERVICE state and stores the packet ready service request in service request FIFO 802.

Bus activity sensor 804 examines packet activity on transmit packet bus 108 primarily through what is called the packet window bus and determines whether transmit packet bus 108 is free to support another packet being outputted from one of transmit access modules 106. Bus activity sensor 804 controls the operation of output controller 803 in conjunction with the empty (E) signal supplied by service request FIFO 802. That is, when there is no activity on transmit packet bus 108, output controller 803 is enabled to release another send packet message to one of transmit access modules 106, if indeed there is a request queued in service request FIFO 802. When there is activity on transmit packet bus 108, output controller 803 is disabled until that activity ceases. Output controller 803 contains combinational and sequential logic (not shown) for first accessing service request FIFO 802 and converting the transmit access module number which was stored there into the correct send packet signal which will be transmitted to one of the transmit access modules 106.

Figure 10:
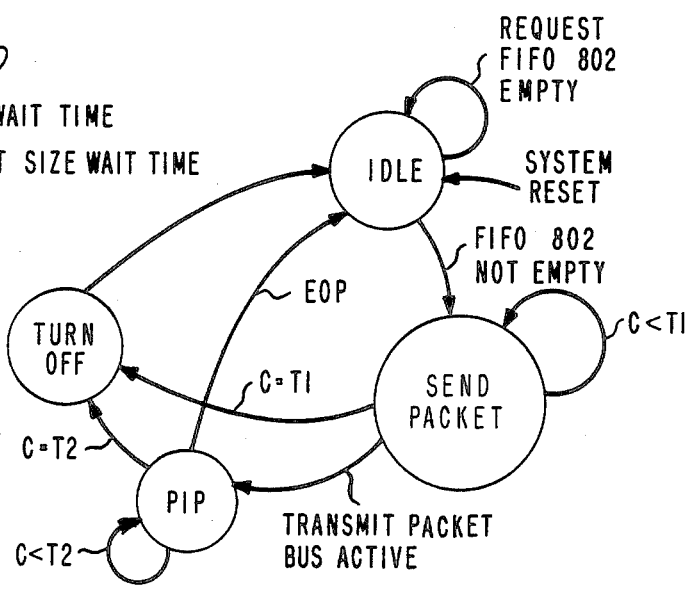
FIG. 10 shows a state diagram illustrating operations effected in output controller 803 in bus controller 107 of FIG. 8.

FIG. 10 shows a detailed state diagram illustrating the operation of output controller 803 of bus controller 107. Upon system reset, output controller 803 goes into an IDLE state and it remains in the IDLE state as long as service request FIFO 802 remains empty. when a service request is stored in service request FIFO 802, control passes to the SEND PACKET state. In the SEND PACKET state, output controller 803 reads the service request for FIFO 802 and formats the correct send packet signal for transmission to the appropriate one of transmit access modules 106. At this time, output controller 803 starts an interval counter call "C" which measures the packet activity interval of transmit packet bus 108. As long as the measured interval of counter C is less than some predetermined time interval T1, controller 803 waits for the corresponding packet to appear on transmit packet bus 108. If no packet appears when the counter time interval C is equal to T1, output controller 803 passes to the TURN-OFF state and the send packet signal is relinquished to the particular one of transmit access modules 106. Once the send packet signal is relinquished, output controller 803 returns to the IDLE state and waits for another service request to be stored in FIFO 802. Thereafter, the new packet ready service request is processed as described above. If, however, transmit packet bus 108 becomes active, output controller 803 passes from the SEND PACKET state to the PACKET IN PROGRESS (PIP) state. As long as a packet is on transmit packet bus 108, output controller 803 remains in the PIP state. In the PIP state, output controller 803 continues to monitor the counter C count to determine if it is less than some other larger predetermined interval, T2. If for some reason the count in counter C becomes equal to interval T2, the output controller 803 passes to the TURN-OFF state and relinquishes the send packet signal to the particular one of transmit access modules 106. If the counter C never reaches a count equal to interval T2, bu the end of a packet is detected, as evidenced by transmit packet bus 108 becoming idle once again, output controller 803 will return to the IDLE state, waiting for the next service request, i.e., packet ready signal, to be received from one of transmit access modules 106. As part of the end of packet transition from the PACKET IN PROGRESS state to the IDLE state, the send packet signal is relinquished to the particular one of transmit access modules 106 being serviced.

Transmit Process Module

Figure 11:
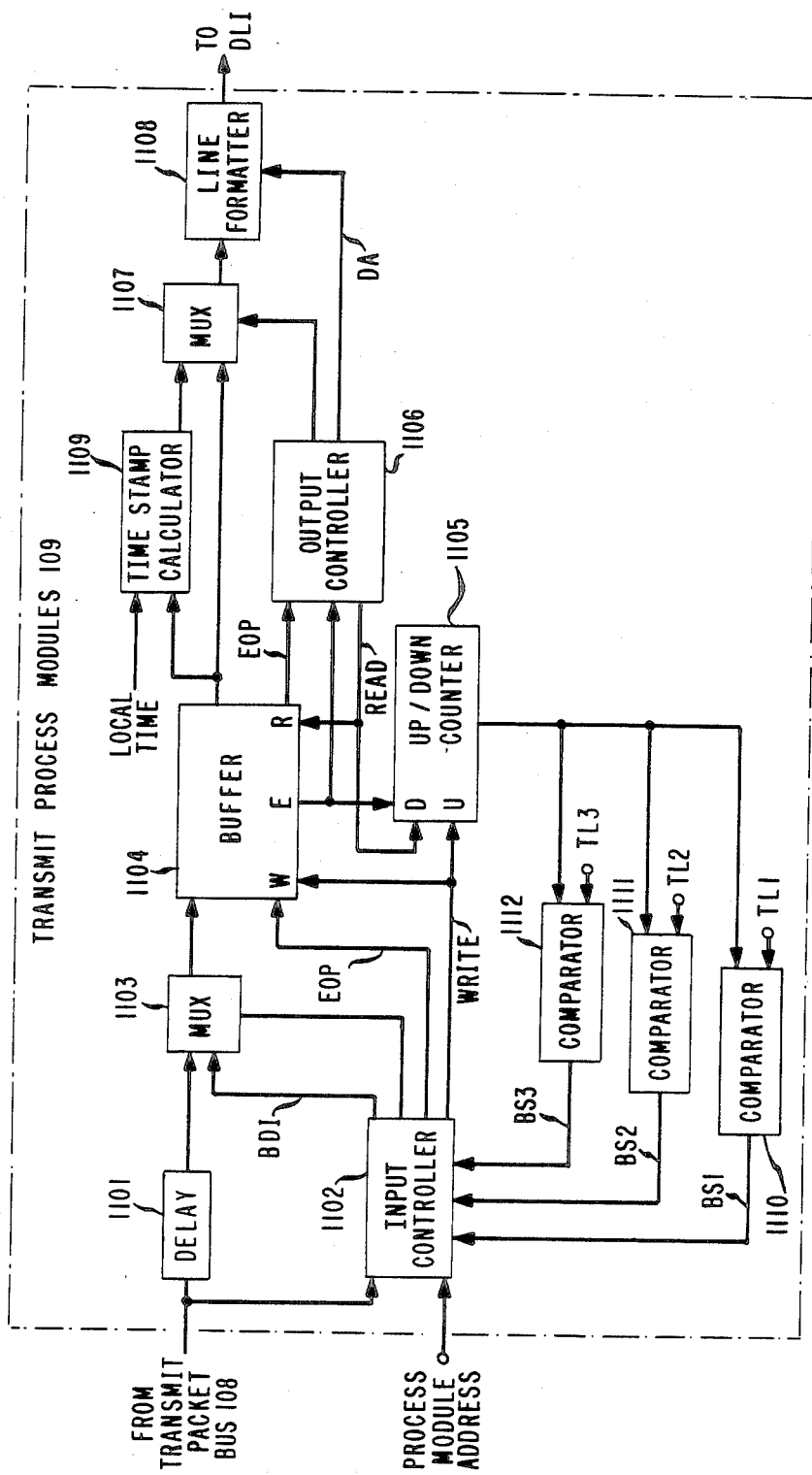
FIG. 11 depicts in simplified block diagram form details of transmit process modules 109 of access interface transmitter 101 of FIG. 1.

FIG. 11 shows in simplified block diagram form details of transmit process modules 109 employed in access interface transmitter 101 of FIG. 1. Each transmit process module 108 monitors transmit packet bus 108 for packets, checking the destination addresses as they appear on transmit packet bus 108. When a particular one of transmit process modules 109 detects its own address in the destination field of a packet header, the packet is supplied to delay 1101. Delay 1101 allows input controller 1102 to process the packet as it is received. To this end, the packet is also supplied to input controller 1102, which controls the entire packet input process of transmit process module 109. That is, input controller 1102 monitors transmit packet bus 108 and applies appropriate controls to multiplexer 1103, buffer 1104 and up/down counter 1105. Buffer 1104 is a so-called FIFO type, i.e., first in-first out type of buffer storage unit. Buffer 1104 is linked also with an up/down counter 1105 which counts the number of bytes of packet data stored in buffer 1104. Output controller 1106 controls reading packets out of transmit process module 109. To this end, output controller 1106 controls the read cycle from buffer 1104, multiplexer 1107, line formatter 1108 and down-counting of up/down counter 1105. Off line from the packet data flow path, time stamp calculator 1109 performs the packet originate time (POT) to time stamp (TS) conversion. Up/down counter 1105 supplies its count, i.e., the number of bytes of packet data stored in buffer 1104, to a first input of each of comparators 1110, 1111 and 1112. Comparators 1110-1112 compare the amount of packet data stored in buffer 1104 with a set of three fixed predetermined thresholds, namely, thresholds TL1, TL2 and TL3. The comparisons of the amount of packet data sorted in buffer 1104 to these thresholds determine wheterh or not packets being processed in transmit process module 109 will, if permissible, have one or more of the enhancement bit fields removed, in accordance with an aspect of the invention, on being inputted into buffer 1104. Comparators 1110, 1111 and 1112 generate buffer status signals BS1, BS2 and BS3, respectively. Buffer status signals BS1, BS2 or BS3 are generated when the count in counter 1105 is greater than the corresponding one of thresholds TL1, TL2 or T3, respectively. Buffer status signals BS1, BS2 and BS3 are supplied to input controller 1102 in order to determine whether input packets should have the bits in one or more of the enhancement bit fields dropped. The algorithm for dropping bits is as follows: if the amount of packet data stored in buffer 1104, as measured by up/down counter 1105, is greater than the first predetermined fixed threshold TL1, the BS1 output from comparator 1110 is true, i.e., a logical 1, and the level 1 enhancement bit field will be dropped from the current packet being processed; thus shortening the packet size and slowing down the speed at which buffer 1104 fills with packet data, in accordance with an aspect of the invention. If the level 1 enhancement bit field has already been dropped or the packet type does not permit bit dropping, then no further action will be taken. If buffer 1104 continues to fill beyond the second predetermined fixed threshold TL2, comparator 1111 yields a true BS2 signal and both the level 1 and level 2 enhancement bit fields will be dropped from the current packet being processed. This will further shorten the size of the packets and further slow the rate at which buffer 1104 fills with packet data, in accordance with an aspect of the invention. Again if both the level 1 and level 2 enhancement bit fields have already been dropped or the packet is of a type that does not permit bit dropping, then no further action will be taken. If only the level 1 enhancement bit field had been dropped the level 2 enhancement bit field would be dropped. It is noted that there is some maximum amount of data which the buffer 1104 can store. This maximum amount of data stored is indicated by the third predetermined fixed threshold TL3. Therefore, if the amount of data stored in buffer 1104 exceeds threshold T3, the current packet being processed is discarded in its entirety and no further packet data will be allowed into the buffer 1104 until some of the packets stored therein have been outputted. This prevents overflow of buffer 1104 and prevents a fraction of a packet from being inputted into buffer 1104. Only whole packets should be stored in buffer 1104. A fractional packet is defined as an arbitrary piece of the received input packet, possibly only a header.

Delay 1101 accepts packet data as its input as seen from the packet data bus 108. Its output is the same packet data delayed by a predetermined number of clock pulses. The data outpout from delay 1101 is applied to multiplexer 1103. Multiplexer is employed to insert a new bit-dropping indicator field (BDI) generated in input controller 1102 at the appropriate time in the header of the packet being processed. The new BDI field will indicate whether none, one or both of the enhancement bit fields have been dropped from the packet being processed. Multiplexer 1103 is controlled by input controller 1102 in order to insert the bit-dropping indicator field into the packet's header at the appropriate time. Multiplexer 1103 output is supplied to buffer 1104. Input controller 1102 also supplies an end of packet (EOP) signal to buffer EOP. This EOP signal is supplied into a separate storage element of the buffer 1104 associated with each byte of the packet data being processed in parallel. Normally, the EOP signal is a logical 0, i.e., a false signal. When the packet has reached its end, the EOP signal associated with the final byte of packet data is set to a logical 1, i.e., a true signal. The write signal is used to control buffer 1104 in order to drop the level 1, level 2 or both of the enhancement bit fields as desired, under control of input controller 1102. The write signal causes the data appearing at the output of multiplexer 1103, a well as the EOP signal, to be stored in buffer 1104 in parallel. When buffer 1104 is empty, it generates an empty (E) indication signal which is supplied to up/down counter 1105 and to output controller 1106. This empty (E) indication signal causes up/down counter 1105 to be reset to its initial condition. By this method, up/down counter 1105 is synchronized to the amount of packet data stored in buffer 1104. A further input to buffer 1104 is a read (R) signal. The read (R) signal supplied by output controller 1106 enables buffer 1104 read circuitry to output the next byte of packet data including the EOP signal. The packet data from the buffer 1104 is applied to multiplexer 1107 as well as to time stamp calculator 1109. The EOP signal is supplied to output controller 1106.

Time stamp calculator 1109 calculates the final value of the time stamp (TS) for each packet as it leaves access interface transmitter 101. This is accomplished by latching the packet originate time (POT) field of the packet and subtracting that packet originate time (POT) from the current local time (LT) indication. That is, we are calculating the packet departure time (LTD) minus the packet originate time (POT), namely, $TS' = LTD - POT$. This updated TS' result is supplied to multiplexer 1107 for insertion into the packet header time stamp field as the new TS value at the appropriate instant under control of output controller 1106. The use of the packet departure timne LD in conjunction with the POT which was determined by using the packet arrival time LTA at the node simplifies the current itme stamp calculation and allows use of only one time stamp field in the packet header, in accordance with an aspect of the invention. Again, it is noted that the same local time signal is used for the time stamp calculations in the node and that the same single time stamp field is used to transport both the packet originate time (POT) value and the updated time stamp (TS) value. The packet data output of multiplexer 1107 is supplied to line formatter 1108. Line formatter 1108 is also supplied with a data available (DA) signal from output controller 1106. The DA signal provides an indication of when packet data has been applied to the digital line formatter 1108 via mulitplexer 1107. Such line formatter arrangements are known in the art. They typically perform such functions as idle flag insertion into the data stream during times when there are no packets, as well as zero bit stuffing to assure that the data patterns do not appear as a flag on the transmission line. Furthermore, line formatter 1108 provides a calculation of a so-called header check sequence of the packet to aid in detecting any transmission errors.

Output controller 1106 controls outputting of packet data from transmit process module 109. Inputs to output controller 1106 include the empty (E) indication signal and the end-of-packet (EOP) indication signal from buffer 1104. Output controller 1105 operates multiplexer 1107 as well as line formatter 1108 in order to enable the line formatter 1108 to process active packet data.

Up/down counter 1105 is employed to measure the amount of the data stored in buffer 1104. The amount of data stored in buffer 1104 is indicated by causing counter 1105 to count up when data is being written into buffer 1104 and to count down when data is being read out. To this end, buffer 1104 write control signal is supplied from input controller 1102 to the upcount input (U) of up/down counter 1105 and buffer 1104 read control signal from output controller 1106 is supplied to the downcount (D) input of counter 1105. Up/down counter 1105 is reset when buffer 1104 is empty via signal E.

Figure 12:
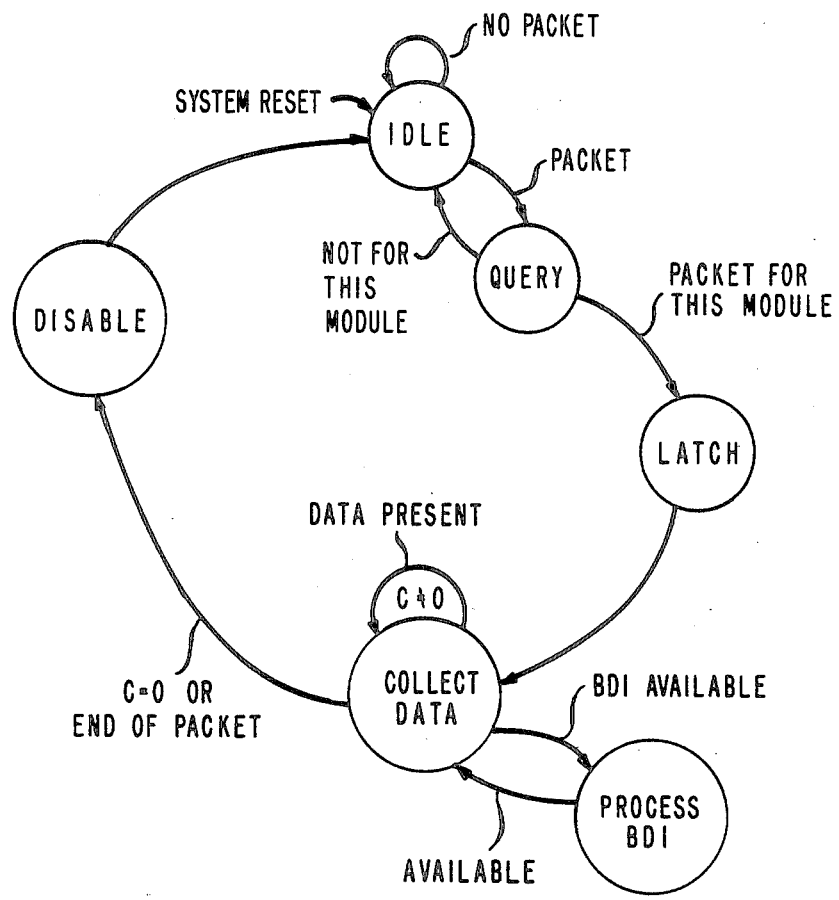
FIG. 12 shows a state diagram illustrating operations effected in input controller 1102 in transmit process modules 109 of FIG. 11.

Operation of input controller 1102 is shown in the state diagram of FIG. 12. From system reset, the IDLE state is entered. Input controller 1102 remains in the IDLE state as long as no packets appear on transmit packet bus 108 and to count the amount of packet data stored in buffer 1104. When a packet is indicated on transmit packet bus 108, input controller 1102 passes to the QUERY state. In the QUERY state, input controller 1102 determines if the internal destination code in the packet header matches the address of this particular transmit process module 109. If the packet internal destination code field does not match the particular process module 109 address, input controller 1102 returns to the IDLE state until another packet appears on transmit packet bus 108. If, however, the internal destination code does match the particular process module 109 address, input controller 1102 passes into the LATCH state. In the LATCH state, input controller 1102 latches the buffer status indications BS1, BS2 and BS3 for use in processing the current packet. Input controller 1102 also sets a counter C to a large nonzero value so that counter indications will not affect the next few data bytes of the packet being processed. Upon completion of these functions, input controller 1102 passes from the LATCH state to the COLLECT DATA state. In the COLLECT DATA state, input controller 1102 decrements the counter C for each byte of data which appears on transmit packet bus 108. Additionally, input controller 1102 supplies write pulses to buffer 1104 and up/down counter 1105 in order to store the packet data as it appears on transmit packet bus 108 and to count the amount of packet data stored in buffer 1104. When the bit-dropping indicator (BDI) field is available on packet transmit bus 108, input controller 1102 passes from the COLLECT DATA state to the PROCESS BID state. In this PROCESS BDI state, input controller 1102 performs several function. First, input controller 1102 latches the BID field of the packet as it is entering the process module 109. Based on the old BDI and the buffer status indications BS1, BS2 and BS3, input controller 1102 chooses an appropriate counter value, C, consistent with the amount of data stored in buffer 1104. This counter value is used to determine the length of the packet being supplied to buffer 1104. Finally, in the PROCESS BDI state, input controller 1102 operates multiplexer 1103 to reinsert and store a new bit-dropping indicator (BDI) field derived from the old bit-dropping indicator and the buffer status indications as described above. When the BDI field is no longer available, input controller 1102 passes back to the COLLECT DATA state in order to collect the remainder of the packet, continuously decrementing the counter C. When the counter C goes to 0, or the end of a packet appears on transmit packet bus 108, input controller 1102 passes to the DISABLE state. In the DISABLE state, input controller 1102 first generates the end-of-packet (EOP) indication which will be stored in buffer 1104. Input controller 1102 also disables any further writing of data into buffer 1104 and upcounting of counter 1105. When these function are accomplished, input controller 1102 passes to the IDLE state awaiting the next packet on transmit packet bus 108.

Figure 13:
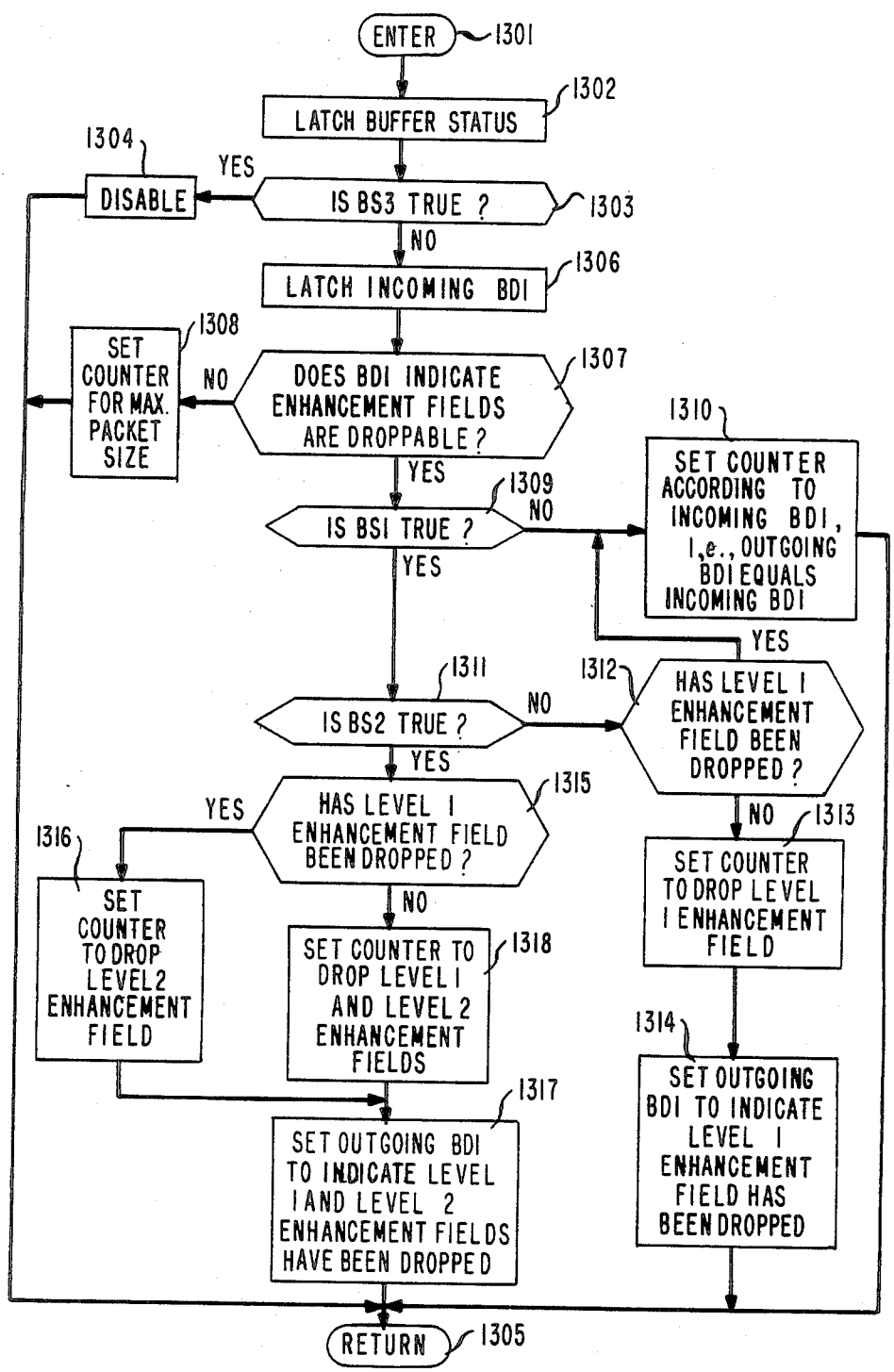
FIG. 13 is a flow chart of a sequence of operations also effected in input controller 1102 of transmit process modules 109 of FIG. 11.

FIG. 13 depicts a flow chart of the sequence of steps in input controller 1102 in setting an internal counter to determine bit dropping, packet length and the current BDI field for the packet being processed. Although the steps are shown sequentially in the flow chart, it will be apparent to those skilled in the art that the preferred implementation of these functions is with a read only memory (ROM) which examines all the necessary inputs simultaneously and performs all of the steps substantially simultaneously to yield the BDI field output and to set the internal counter in input controller 1102. The flow chart shown in FIG. 13 is entered for every packet which appears on packet transmit bus 108 in order to determine correct internal counter values. On appearance of a packet having an internal destination code which matches the address for this transmit process module 109, the sequence is entered via 1301. The first ask to be performed is indicated in operational block 1302 at which time the buffer status values BS1, BS2 and BS3 are latched. This occurs simultaneously with the LATCH state as described in the previous state diagram of FIG. 12. Thereafter, conditional branch point 1303 tests to determine whether or not buffer 1104 is full. that is, whether additional data may be stored therein. If buffer 1104 is indeed full, as indicated by BS3 being true, i.e., a logical 1, further operation to determine the counter value is abandoned and the process returns through the disable block 1304 and return 1305 to its initial state of waiting for a packet to appear on transmit packet bus 108 destined for this transmit process module 109. That is to say, the current packet being processed is dropped in its entirety by disabling writing of buffer 1104 (FIG. 11). If, however, there is room in the buffer 1104 for an additional packet or more, as indicated by the test in step 1303 yielding a NO result, the incoming BDI is latched, as indicated in block 1306, by input controller 1102. Conditional branch point 1307 tests the BID field to determine whether the BDI field indicates a packet which can have one or more of the enhancement bit fields dropped or not. If the BDI field indicates that none of the enhancement bit fields can be dropped and the test result is NO, control is transferred to block 1308 and the internal counter is set to be the maximum value allowed for a packet in the system. Control is then returned to the main process via 1305. If the test result in step 1307 is YES, conditional branch point 1309 tests to determine whether BS1 is true, i.e., a logical 1. BS1 is an indication of whether or not the amount of data stored in buffer 1104 is greater than the first predetermined threshold TL1. If the amount of data stored in buffer 1104 is not greater than the threshold TL1, as indicated by BS1 being false, i.e., a logical 0, none of the enhancement bit fields need be dropped and control is transferred to operational block 1310. Operational block 1310 causes the counter value to be set consistent with the incoming BDI. The outgoing BDI is also set equal to the incoming BDI. It should be noted that the incoming BDI may indicate that one or both of the enhancement bit fields have been dropped or that none of the enhancement bit fields has been dropped. This dropping of one or more of the enhancement bit fields may have occurred in some other switching or transmission node in the packet system. Thereafter, control is returned via 1305. If, however, the test result in step 1309 is YES, the amount of data stored in buffer 1104 is greater than the first threshold TL1 and conditional branch point 1311 tests BS2 to determine whether or not the amount of data stored of buffer 1104 is greater than some predetermined threshold TL2. If the test result in step 1311 is NO, i.e., BS2 is not greater than threshold TL2, then conditional branch point 1312 tests to determine whether the level 1 enhancement bit field has been dropped. This test is performed by examining the BDI field in the incoming packet header. If the test result in step 1312 is YES, the level 1 enhancement bit field has been dropped, and control is transferred to operational block 1310 where the internal counter value is set consistent with the incoming BDI and the outgoing BDI is set to equal the incoming BDI. If the test result in step 1312 is NO, the level 1 enhancement bit field has not been dropped, and control is transferred to operational block 1313 where the intenral counter is set in order to drop the level 1 enhancement bit field. Operational block 1314 sets the outgoing BDI to indicate that the level 1 enhancement bit field has indeed been dropped. Thereafter, control is returned to the main process via 1305. Returning to step 1311, if the test result therein is YES, the amount of data stored in buffer 1104 is greater than threshold TL2, and conditional branch point 1315 tests the BDI field of the packet being processed to determine whether the level 1 enhancement bit field has been dropped. If the test result in step 1315 is YES, the level 1 enhancement bit field has been dropped, and operational block 1316 causes the internal counter to be set to drop the level 2 enhancement bit field. Thereafter, operational block 1317 causes the outgoing BDI to be set to indicate that both the level 1 and level 2 enhancement bit fields have been dropped. Once the BDI has been set, control is returned to the main process via 1305. If the test result in step 1315 is NO, the level 1 enhancement bit field has not been dropped, and operational block 1318 causes the internal counter to be set to drop both the level 1 and level 2 enhancement bit fields. Thereafter, control is transferred to operational block 1317 which sets the outgoing BDI to indicate that both level 1 and level 2 enhancement bit fields have been dropped. Thereafter, control is returned to the main process via 1305. Although only two enhancement bit fields are used in this example, it will be apparent that this process could be expanded for any number of enhancement fit fields. It should also be noted that the bit fields are dropped from the packet in a prescribed order beginning from the bit field including the least significant bits toward the bit field including the most significant bits. It should be noted that the enhancement bit fields are dropped in order from the enhancement bit field including the last significant bits of the corresponding transmission channel toward the enhancement bit field including the most significant bits of the corresponding transmission channel.

Figure 14:
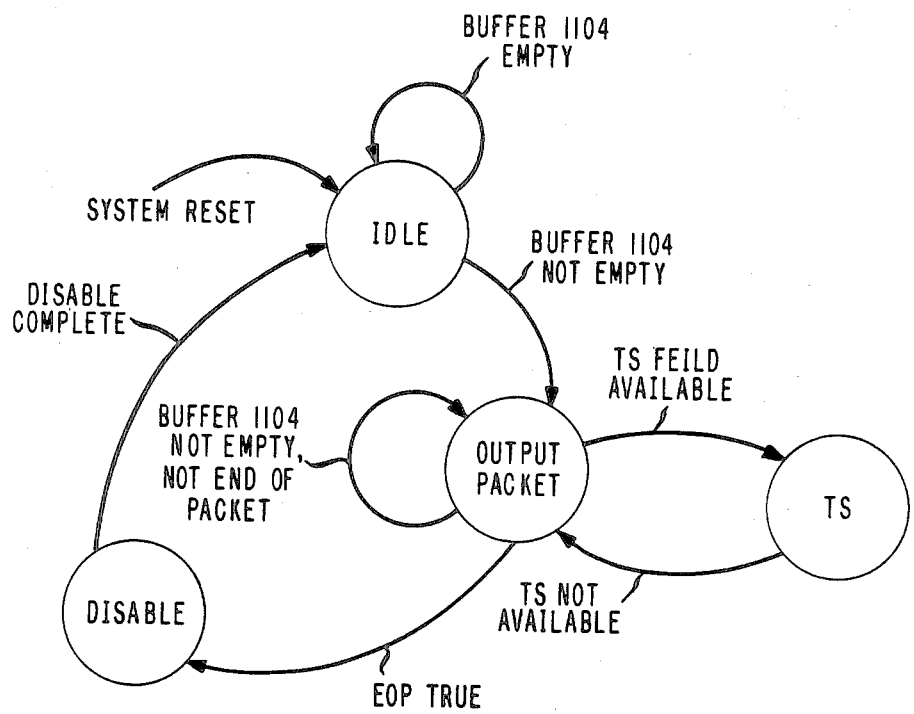
FIG. 14 shows a state diagram of operations effected in output controller 1106 in transmit process modules 109 of FIG. 11.

FIG. 14 depicts a state diagram of a sequence of steps illustrating the operation of output controller 1106 in the transmit process module 109 of FIG. 11. The state diagram is entered from system reset and the output controller 1106 transfers to the IDLE state. Output controller 1106 remains in the IDLE state as long as buffer 1104 is empty. When buffer 1104 is not empty, as indicated by a logical 0 empty (E) signal from buffer 1104, output controller 1106 transfer to the OUTPUT PACKET state. While in the OUTPUT PACKET state, output controller 1106 enables reading of a packet from buffer 1104 as well as decrementing up/down counter 1105. Output controller 1106 also operates multiplexer 1107 to allow passage of the packet data from buffer 1104. Finally, as each byte of packet data is read from buffer 1104, output controller 1106 enables line formatter 1108 to perform its operation. When the time stamp (TS) field is available in the packet being read from buffer 1104, output controller 1106 passes to the TS state. In the TS state, output controller 1106 operates multiplexer 1107 to insert the new time stamp field from time stamp calculator 1109 in the packet header. As with other bytes of packet data being outputted, output controller 1106 also enables line formatter 1108 to code the time stamp field for transmission to the digital line interfaces. When the time stamp field is no longer available, control passes back to the OUTPUT PACKET state and the above-mentioned functions are iterated. Output controller 1106 remains in the OUTPUT PACKET state as long as buffer 1104 is not empty and it snot the end of a packet as indicated by the EOP signal. The end of a packet is indicated by a logical 1 EOP signal appearing in the last byte of packet data from buffer 1104. The logial 1 EOP signal causes control to pass to the DISABLE state. In the DISABLE state, output controller 1106 disables the decrementing of up/down counter 1105, disables any further reading of buffer 1104 and causes the DA signal to become a logical 0 indicating to line formatter 1108 that the packet is no longer available. When line formatter 1108 no longer has packet data available to be outputted, it automatically outputs flag signal. Thereafter, outpout controller 1106 passes to the IDLE state where it awaits more packet data in buffer 1104 to be outputted. If there is packet data in buffer 104, the IDLE state will be exited immediately.

Receive Process Module

Figure 15:
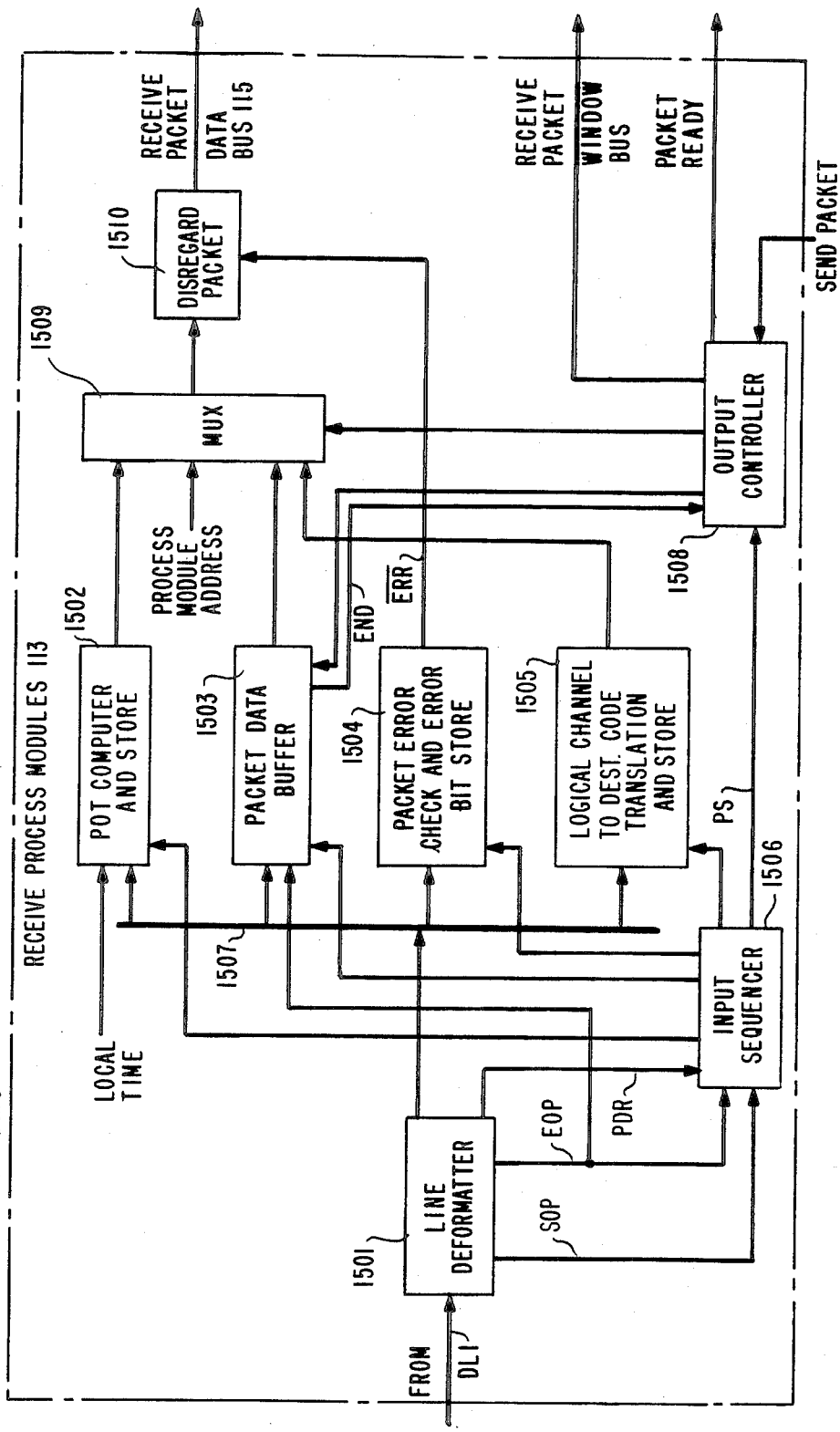
FIG. 15 depicts in simplified block diagram form details of receive process modules 113 of access interface receiver 102 of FIG. 1.

FIG. 15 shows in simplified block diagram form details of receive process modules 113, which are employed in the access interface receiver 102 of FIG. 1. The 32 time slot packetized time division multiplexed signals from an associated one of digital line interface units 112 (FIG. 1) are supplied at, in this example, a 2.048 Mb/sec rate to line deformatter 1501. Line deformatter 1501 functions include removal of idle flags from the packet data stream, removal of stuffed bits from the received packet data stream, and the generation of several control signals. These control signals are a start of packet (SOP) signal, an end of packet (EOP) signal and a packet data ready (PDR) signal. Finally digital line deformatter 1501 outputs the received packet data in an eight-bit parallel form onto bus 1507. The start of packet (SOP) signal and the end of packet (EOP) signal are supplied to input sequencer 1506. The end of packet (EOP) signal is also supplied to packet data buffer 1503. The packet data is supplied by bus 1507 to packet originate time (POT) computer and store 1502, packet data buffer 1503, packet error check and error bit store 1504 and, finally, to logical channel to designation code translation and store 1505. Each of units 1502, 1503, 1504 and 1505 is controlled by input sequencer 1506. Input sequencer 1506 also supplies a packet stored (PS) signal to output controller 1508. Packet originate time (POT) computer and store 1502 examines the received packet data in the time stamp field and calculates the packet originate time (POT), namely, POT=LTA−TS, where TS is the time stamp value from the time stamp field of the received packet and LTA is the local time upon the packet arriving int he particular one of receive process modules 113. LTA is derived from the local timing unit 120 (FIG. 1). This POT value is stored during the packet interval in preparation for outputting via multiplexer 1509 to the receive packet bus 115. Again, the use of the POT value calculated upon the arrival of packet of a system node simplifies the time stamp computation and reduces the number of header time stamp fields, in accordance with an aspect of the invention. Multiplexer 1509 is controlled by output controller 1508. Packet data buffer 1503 simply stores all received packet data plus one flag bit which is called the end of packet flag (END). This flag bit is further used to delimit the packets upon their being outputted to receive packet bus 115. The stored packet data is supplied to multiplexer 1509 for outputting under control of output controller 1508. The end of current packet (END) signal is also supplied from packet data buffer 1503 to output controller 1508.

Packet data in the packet header is also provide dot packet error check and error bit store 1504 via bus 1507. This unit generates a cyclic redundancy code (CRC) check of the packet header in order to detect any bit errors in transmission. A signal $\overline{ERR}$ is outputted from packet error check and error bit store 1504, which is an indication of whether or not the packet data is in error. The $\overline{ERR}$ signal is used to drop the entire packet if there is an error. The $\overline{ERR}$ signal is supplied to one input of disregard packet unit 1510. Finally, the packet data is also supplied from line deformatter 1501 to the logical channel to destination code translation and store 1505. This unit examines the received logical channel number (LCN) and uses the value of the received LCN to determine the one of receive access modules 116 to which the received packet must be supplied. The LCN is translated to the destination code value which is stored during packet reception and outputted to multiplexer 1509 during packet playback to the appropriate one of receive access modules 116. Also supplied to multiplexer 1509 is the receive process module address. Output controller 1508 controls inserting the POT value into the time stamp field and the generation of the desintation code and process module address fields as well as the outputting of the packets to receive packet bus 115. The outputting of packets is obtained by interaction with receive bus controller 114 (FIG. 1). To this end, packet ready request signals are supplied to receive bus controller 114 and corresponding send packet signals are received from bus controller 114. The operation of bus controller 114 is identical to that of bus controller 107 described above.

Figure 16:
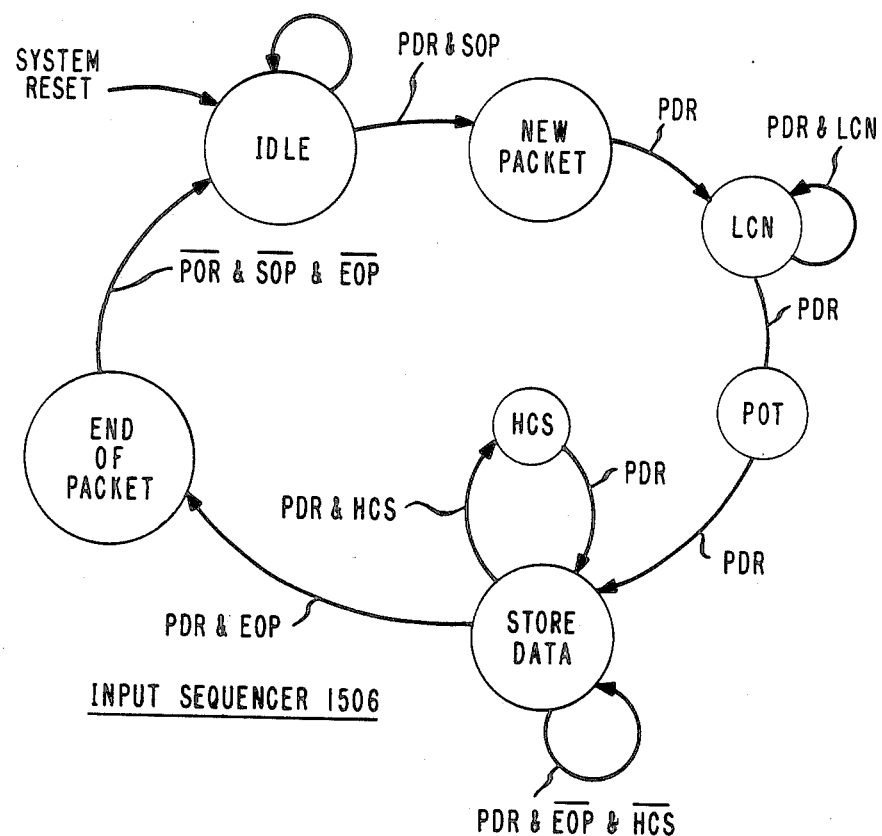
FIG. 16 shows a state diagram illustrating a sequence of operations effected in input sequencer 1506 in receive process modules 113 of FIG. 15.

FIG. 16 is a state diagram illustrating the operation of input sequencer 1506. The state diagram is entered from system reset into the IDLE state. Input sequence 1506 remains in the IDLE state as long as there is no packet data provided from the digital line interface to line deformatter 1051. The indication that a packet is arriving is the start of packet (SOP) signal. When the start of packet (SOP) signal is true, i.e., a logical 1, and the packet data is ready, as indicated by the packet data ready (PDR) signal being a logical 1, input sequencer 1506 passes to the NEW PACKET state. In the NE PACKET state, input sequencer 1506 enables packet data buffer 1503 to store the entire packet as it comes in and to continue storing the packet until it is finished, as evidenced by the end of packet (EOP) signal. At this time packet error check and error bit store 1504 is also enabled to begin calculation of the header check sequence. When the packet data ready (PDR) signal is again true, input sequencer 1506 passes into the LOGICAL CHANNEL NUMBER (LCN) state. In this LCN state, both packet data buffer 1503 writing, as well as logical channel to destination code translation and store 1505 operation, are enabled. Input sequencer 1506 remains in the LCN state for two data bytes, passing back to the LCN state when packet data ready (PDR) is true again. During this time, logical channel to destination code translation and store 1505 is latching the entire logical channel number (LCN) from the packet header, which takes two data bytes. Following the logical channel number (LCN), the next packet data ready (PDR) signal causes input sequencer 1506 to pass to the PACKET ORIGINATE TIME (POT) ENABLE state. When the packet originate time (POT) is available, input sequencer 1506 enables the POT computer and store 1502 to latch the time stamp field as it comes in on the packet. POT computer and store 1502 now has all the data necessary to calculate the packet originate time (POT) as described above. When the next data byte is available, as indicated by the packet data ready (PDR) signal being true again, input sequencer 1506 passes to the STORE DATA state. Input sequencer 1506 remains in the STORE DATA sate until the occurence of one of several possible events. The first event which could occur is that the header check sequence (HCS) has appeared on bus 1507. Upon the header check sequence (HCS) appearing on bus 1507, packet error check and error bit sotre 1504 receives the header check sequence (HCS) and finalizes calculation of the error bits ($\overline{ERR}$). Following the header check sequence, the next packet data ready (PDR) signal indicates that part of the information field of the packet is available. Input sequencer 1506 returns to the STORE DATA state and remains there until the rest of the information field of the packet is stored. Input sequencer 1506 leaves the STORE DATA state when the end of packet (EOP) signal is true, as well as the packet data ready (PDR) signal being true and passes to the END OF PACKET state where the final data byte of the current packet is stored in packet data buffer 1503. At this time, upon reception of the inverses of packet data ready ($\overline{PDR}$), start of packet ($\overline{SOP}$) and end of packet ($\overline{EOP}$), packet data buffer 1503 is disabled and input sequencer 1506 outputs the packet stored (PS) signal and returns to the IDLE state, waiting for another input packet.

The packet output process of receive process modules 113 operates as follows: During packet input, the POT computer and store 1502, packet error check and error bit store 1504 and logical channel to destination code translation and store 1505 all compute results based on the current input packet header. These results are available for outputting in serial form and are remultiplexed into the packet in the appropriate fields by multiplexer 1509 under control of output controller 1508. During the packet output cycle, output controller 1508 controls both multiplexer 1509 and packet data buffer 1503 by enabling or disabling the respective read controls. If a received packet includes erros, the error bit ($\overline{ERR}$) from packet error check and error bit store 1504 is used to inhibit the packet data from passing to receive packet bus 115 by enabling disregard packet unit 1510. If the packet is indeed in error, a string of zeros will be supplied to receive packet bus 115 in place of the packet.

Figure 17:
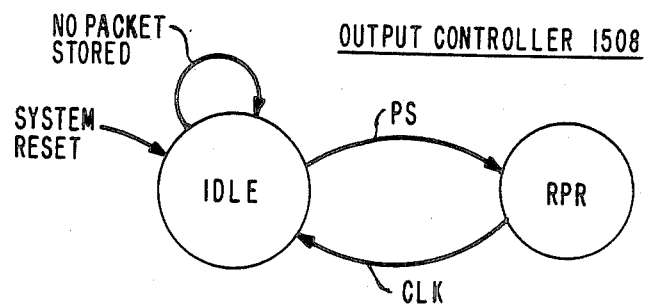
FIGS. 17 and 18 show state diagrams of operations effected in output controller 1508 in receive process modules 113 of FIG. 15.
Figure 18:
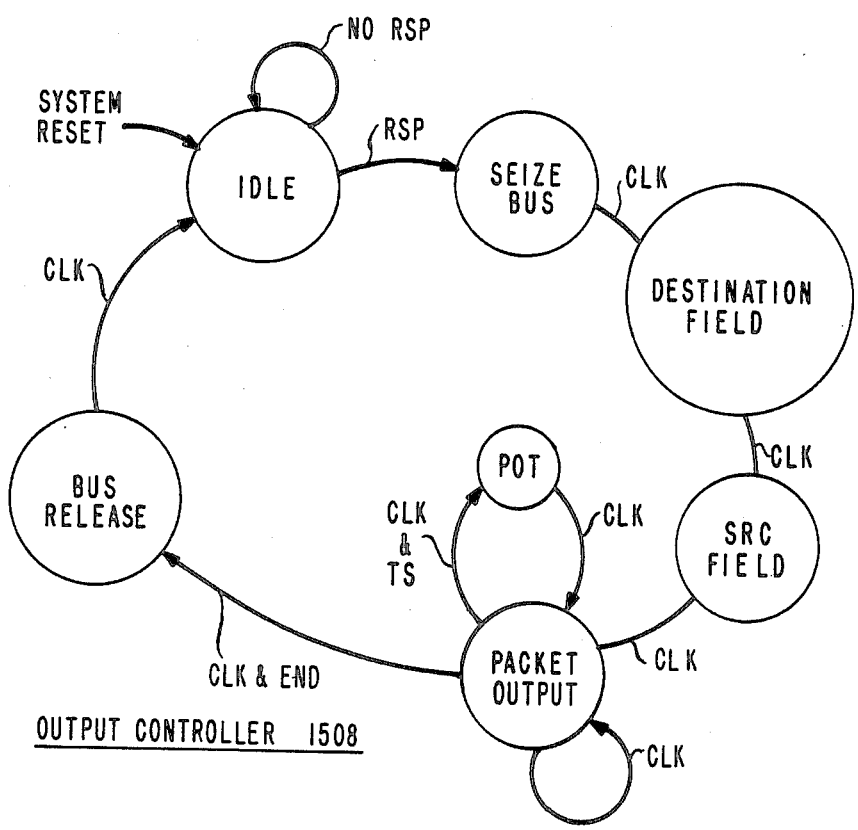

The operation of output controller 1508 in effecting the packet output process is illustrated in the state diagrams of FIGS. 17 and 18.

FIG. 17 shows a state diagram of the interaction of output controller 1508 with bus controller 114 (FIG. 1). The state diagram is entered into the IDLE state from system reset. When the packet stored (PS) signal from input sequencer 1506 is true, output controller 1508 passes to the RECEIVE PACKET (RPR) READY state. At this time, the packet ready signal going to bus controller 114 is asserted. On the following system clock (CLK) pulse, output controller 1508 passes back to the IDLE state.

FIG. 18 shows a state diagram illustrating operation of output controller 1508 in controlling the outputting of packets from receive process modules 113 to receive packet bus 115. The packet output process is operated for the most part synchronously with the system clock so the following description of the operation of output controller 1508 will indicate operations occurring on successive clock pulses. Output controller 1508 enters the IDLE state from system reset. As long as there are no packets stored in packet data buffer 1503 to be outputted, output controller 1508 remains in the IDLE state. Upon reception of a receive send packet (RSP) signal from bus controller 114, output controller 1508 passes from the IDLE state to the SEIZE BUS state during which receive packet bus 115 is seized for outputting a packet and packet data buffer 1503 is enabled for reading. This is achieved in well-known fashion by a signal on the receive packet window bus. During the next two clock (CLK) pulses, i.e., the output time for the first two packet header fields, multiplexer 1508 is enabled to supply the internal destination code to receive packet bus 115. This is done during the DESTINATION FIELD state and the SRC FIELD state. On the next clock (CLK) pulse following the internal destination code field, multiplexer 1508 is enabled to supply the process module address to the receive packet bus 115. After outputting the receive process module address, the next clock pulse (CLK) causes output controller 1508 to pass into the DATA OUTPUT state where most of the packet data is outputted onto receive packet bus 115. At the time when the time stamp (TS) field is available to be outputted to receive packet bus 115, however, output controller 1508 passes to the PACKET ORIGINATE TIME (POT) state and enables multiplexer 1508 to output the POT result stored in POT computer and store 1502. Upon the following clock (CLK) pulse, output controller 1508 returns to the PACKET OUTPUT state and will remain there for successive system clock (CLK) pulses until the remainder of the current packet is outputted from packet data buffer 1503 to receive packet bus 115. When the END signal from packet data buffer 1503 is true, which indicates the end of the current packet being outputted therefrom, and on the next clock (CLK) pulse, output controller 1508 passes to the BUS RELEASE state. In this BUS RELEASE state, the final byte of the current packet is outputted from packet data buffer 1503 to receive packet bus 115 and receive packet bus 115 is released for use by another one of receive process modules 113. During this BUs release state, the output controller 1508 is also reset and, on the following clock (CLK) pulse, the output controller 1508 passes back to the IDLE state.

Receive Access Module

Figure 19:
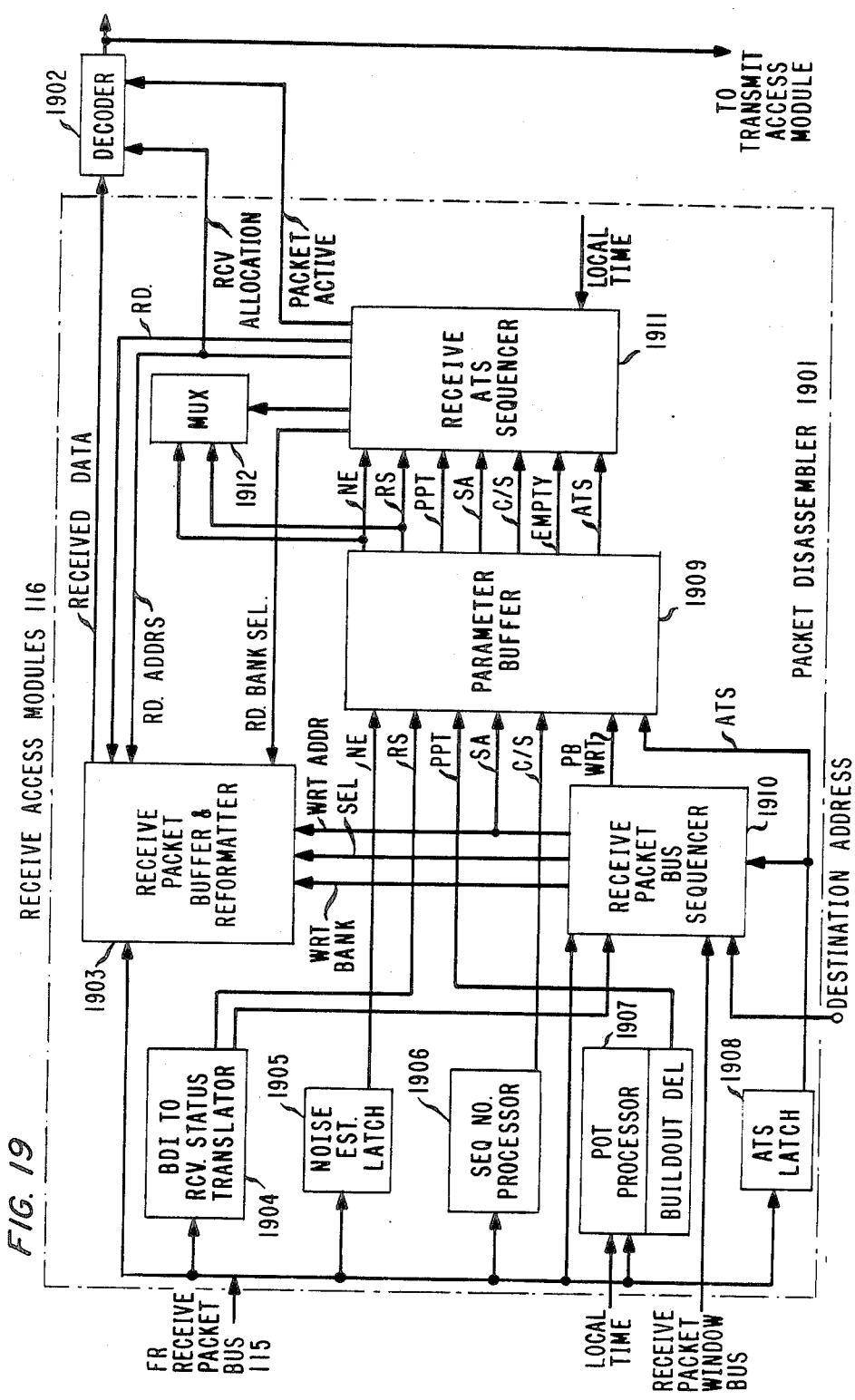
FIG. 19 depicts in simplified block diagram form details of receive access modules 116 of access interface receiver 102 of FIG. 1.

FIG. 19 shows in simplified block diagram form details of receive access modules 116 employed in the access interface receiver 102 of FIG. 1. It is noted, that packets experience both fixed and random delays in a packet network. In reconstructing digital samples from packets it is important that the effects of the random delays be minimized in order to eliminate gaps and the like from occurring in the reconstructed signals. This is achieved, in individual ones of receive access modules 116 by adjusting the delay experienced by each of the packets to some fixed overall delay ($D_O$) interval. The fixed overall delay interval comprises a known fixed delay ($D_F$) interval caused by transmission and processing of the packets, a random delay (TS) interval measured by employing the unique time stamp technique, and an adjustable delay (D) interval for building out the random delay interval to a known fixed build out delay (BLD) interval. That is, $(TS+D)+D_F=D_O$, where $TS+D=BLD$. In a specific example, $D_O=44$ milliseconds, $D_F=24$ milliseconds and BLD=20 milliseconds. Additionally, it is desirable to save late arriving packets in order to eliminate undesirable effects in reconstructed speech signals. As described hereinafter, the state variables of decoder 1902 are held constant for up to a first prescribed interval after reading to of samples from the information field of the last previous packet. If a packet is determined to be late arriving, decoder 1902 passes from the hold variables state to its normal operational state and reading out of samples from the information field of the later arriving packet is initiated immediatly.

Accordingly, shown in FIG. 19 are packet disassembler 1901 and decoder 1902. Included in packet disassembler 1901 is receive packet buffer and reformatter 1903, BDI to receive status translator 1904, noise estimate latch 1905, sequence number processor 1906, packet originate time (POT) processor and buildout delay register 1907 and access time lot (ATS) latch 1908 all of which receive packet data from receive packet bus 115. The local time signal from local timing unit 120 (FIG. 1) is supplied to POT processor and buildout delay register 1907. The receive packet window bus from receive packet bus 115 is supplied to receive packet bus sequencer 1910. Also supplied to receive packet bus sequencer 1910 is the packet data from receive packet bus 115, a packet length signal from BDI to receive status translator 1904, an internal destination adress from the receive access module back-plane and the access time slot signal (ATS) from ATS latch 1908. Receive packet bus sequencer 1910 supplies a plurality of control signals to receive packet buffer and reformatter 1903. Specifically, the control signals include a write (WRT) signal, a memory bank select (BANK SEL) signal and a write address (WRT ADDR) signal. Additionally, receive packet bus sequencer 1910 supplies a start address (S) signal (same as WRT ADDR) and a parameter buffer write control signal (PBWRT) to parameter buffer 1909. The start address (SA) signal indicates the memory location in receive packet buffer adn reformatter 1903 in which the first sample is stored of the current packet in the current time slot. Although not specifically shown, receive packet bus sequencer 1910 supplies control signals to each of BDI to receive status translator 1904, noise estimate latch 1905, sequence number processor 1906, POT processor and buildout delay register 1907 and ATS latch 1908 for effecting control of those units, as will be described below. Parameter buffer 1909 is a first-in first-out (FIFO) type buffer which stores relevant information from the packet header that is used by receive access time slot (ATS) sequencer 1911 for controlling the outputting of reformatted packet data from receive packet buffer and reformatter 1903. To this end, a receive status (RS) signal is supplied to buffer 1909 from BDI to receive status translator 1904; a background noise estimate (NE) signal is supplied from noise estimate latch 1905; a packet playout time (PPT) signal is supplied from POT processor and buildout delay 1907; a cat/sched (C/S) control signal is supplied from sequence number processor 1906; and finally, the ATS control signal is supplied from ATS latch 1908. As indicated above, parameter buffer 1909 stores this plurality of signals for use by receive ATS sequencer 1911 for outputting data from receive packet buffer and reformatter 1903 in the appropriate PCM or ADPCM format. Accordingly, the receive status (RS) signal, the noise estimate (NE) signal, the start address (SA) signal, the packet playout time (PPT) signal, the cat/sched (C/S) signal, the ATS signal and an additional signal (EMPTY) which indicates that parameter buffer 1909 is empty are supplied to receive ATS sequencer 1911. If the EMPTY signal is true, i.e., a logical 1, parameter buffer 1909 is empty and there are no packets to be processed in receive packet buffer and reformatter 1903. Additionally, the receive status (RS) signal and the noise estimate (NE) signal are supplied to multiplexer 1912. A local time signal from local timing unit 120 (FIG. 1) is also supplied to receive ATS sequencer 1911.

Receiver ATS sequencer 1911 operates to control the outputting of reformatted data from packet disassembler 1901. To this end, it generates a signal for controlling multiplexer 1912 to supply the receive status and noise estimate signals at the appropriate times to decoder 1902 for use, as will be described below in the decoder 1902 description. Receive ATS sequencer 1911 also generates a packet active signal which is also supplied to decoder 1902 for use as will be described below. To control the outputting of reformatted data from receive packet buffer and reformatter 1903, receive ATS sequencer 1911 supplies thereto a read (RD) signal, a read address (RD ADDR) signal and a read memory bank select (RD BANK SEL) signal. Operation of receive ATS sequencer 1911 is described below in conjunction with the flow charts shown in FIGS. 22 and 23.

BDI to receive status translator 1904 includes a latch memory and read only memory unit (ROM) (not shown). The incoming BDI field is employed as an address to the ROM which provides the receive status (RS) signal and the packet length signal. Specifically, the receive status (RS) signal indicates the type of coding which was employed in in the corresponding access interface transmitter. For example, whether it was 8-bit PCM coding, embedded ADCM coding, that is, 4/3-bits embedded coding, 4/2-bits embedded coding, or 3/2-bits embedded coding, four-bit ADPCM, three-bit ADPCM or two-bit ADPCM. The length signal indicates the length of the packet to be played out of packet disassembler 1901, i.e., whether or not any of the enhancement bit fields have been dropped for the embedded coding packets.

Noise estaimte latch 1905 is a four-bit memory which stores a background noise estimate from the receive packet header.

Sequence number procesor 1906 includes a latch memory unit, a virtual sequence counter and control logic (not shown) to generate the so-called cat/sched (C/S) signal, in accordance with an aspect of the invention. If the packet is an initial packet of an information spurt, this packet must be scheduled for playout according to the packet playout time generated by POT processor and buildout delay register 1907. The identification of a packet as the initial packet in an information spurt is obtained by advantageously employing the unique virtual sequency number scheme, in accordance with an aspect of the invention. As indicated above, the virtual sequence includes a continuous sequence of numbers not including the unique number used to identify the initial packet in the information spurt. If it is not an initial packet, the packet is concatenated with the previous packet for playout. If the packet is late arriving, it is played out immediately and is still considered a concatenate packet. If one or more packets haave been lost prior to receiving this particular packet, sequence number processor 1906 will schedule the current packet for playout, also according to the packet playout time generated by POT processor and buildout delay register 1907. That is, the current packet is treated as though it is an initial packet.

Figure 20:
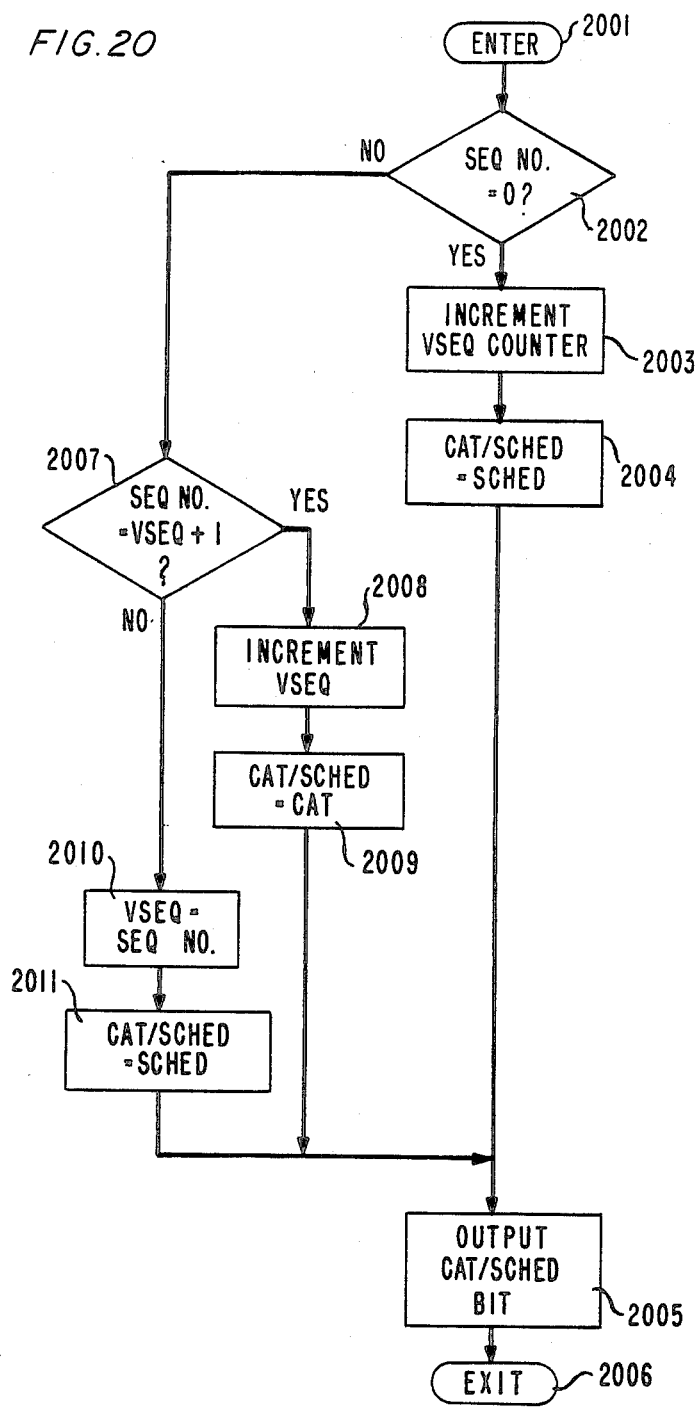
FIG. 20 is a flow chart of a sequence of operations effected in sequence number processor 1906 in receive access modules 116 of FIG. 19.

FIG. 20 is a flow chart illustrating the steps of the control logic of sequence number processor 1906 in generating the cat/sched (C/S) signal. Accordingly, the sequence is entered via 2001 for each packet processed by this particular receive access module 116. Thereafter, conditional branch point 2002 tests to determine whether the sequence number is the unique number reserved to identify the initial packet in the information spurt, in this example, zero (0). If the test result in step 2002 is YES, operational block 2003 causes the virtual sequence counter to be incremented. Since the test result in Step 2002 was YES, indicating that the packet is the initial packet in an information spurt, operational block 2004 sets the cat/sched (C/S) signal to sched, i.e., a logical 1, which will cause the playout of this initial packet to be scheduled according to the packet playout time (PPT) generated in POT processor and buildout delay 1907. The operational block 2005 causes the cat/sched (C/S) signal to be outputted to parameter buffer 1909. Therafter, the sequence is exited via 2006. Returning to step 2002, if the test result therein is NO, the packet virtual sequence number is not zero (0), which indicates that it is not an initial packet in an information spurt and conditional branch point 2007 tests to determine whether the sequence number is equal to the value in the virtual sequence counter plus one. The test is step 2007 is to determine whether or not the current packet being processed follows a lost packet or not, in accordance with an aspect of the invention. If the test result is YES, this packet does not follow a lost packet and operational block 2008 causes the virtual sequence counter to be incremented. Operational block 2009 causes the cat/sched (C/S) signal to be set to cat, i.e., a logical 0. Thereafter, operational block 2005 causes the cat/sched (C/S) signal to be outputted to parameter buffer 1909. The sequence is thereafter exited via 2006. Returning to step 2007, if the test result therein is NO, indicating that the current packet has followed a lost packet, operational block 2010 causes the virtual sequence counter to be set to the sequence number of the current packet. The next processed packet, if there is one in the information spurt, would be a cat packet which is concatenated on the current scheduled packet. Operational block 2011 causes the cat/sched indication to be set to since the current packet requires to be scheduled for playout according to the packet playout time generated by POT processor and buildout delay 1907. That is to say, the current packet that has followed a lost packet is considered to be an initial packet and treated as such. Thereafter, operational block 2005 causes the cat/sched bit to be outputted to parameter buffer 1909. The process is therefter exited via 2006.

POT processor and buildout delay register 1907 includes a latch memory for storing the POT field from the packet header and control logic (not shown) for generating the packet playout time (PPT). Also included is a register to provide the programmed system buildout (BLD) delay for the packet. The packet playout time (PPT) is a local time value when a first sample from a corresponding packet information field is to be read from receive packet buffer and reformatter 1903. The packet playout time is computed so that the packet data experiences the desired fixed overall delay ($D_O$). This fixed overall delay is realized by uniquely employing the packet originate time (POT) value and the buildout delay (BLD) value. As indicated above, the randomness of the delay experienced by the packet is eliminated by "building out" the delay to a known value. Then, the fixed overall delay is obtained by outputting the first sample of the packet information field at the local time value equal to the packet playout time (PPT) value, namely $PPT=POT+BLD$. The packet originate time (POT) currently being generated is $POT=LTA-TA$, where LTA is the arrival time of the current packet at the network node and TS is the time stamp value from the time stamp field of the current packet header. The packet playout time (PPT) value is supplied to packet parameter buffer 1909.

ATS latch 1908 is simply a latch memory which stores the ATS portion of the internal destination code field of the packet header.

Receive packet buffer and reformatter 1903 includes a plurality of memory units (not shown) for appropriately storing the bits of the packet information fields. Specifically, the memory units are arranged to separately store packet data in odd and even time slots. Each of these memory units includes storage elements for storing, for example, all the sign bits, all the (1) bits, all the (2) bits, etc., or all the sign (s) bits, all the (a) bits, all the (b) bits, etc., through the number of bits used in the particular packet. In this example, the maximum number of bits is 8 including the sign bit. Writing the received packet information field bits into the receive packet buffer and reformatter 1903 is controlled by receive packet bus sequencer 1910, which will be described in conjunction with the state diagram shown in FIG. 21. The so-called reformatting of the packet information fields is effected in the reading out of the data from the memory units under control of receive ATS sequencer 1911, which operation will be described in conjunction with the flow charts shown in FIGS. 22 and 23. As indicated above, the packet information field in either of the formats shown in FIGS. 3 or 4 is written into receive packet buffer and reformatter 1903 and the data is reformatted into the desired pCM or ADPCM format upon reading the data out therefrom. This is realized by proper selection of the write and read address lines of receive packet buffer and reformatter 1903. It is noted that if the reformatted PCM sample is 8-bit PCM, then decoder 1902 is by-passed (not shown) in well known fashion.

Figure 21:
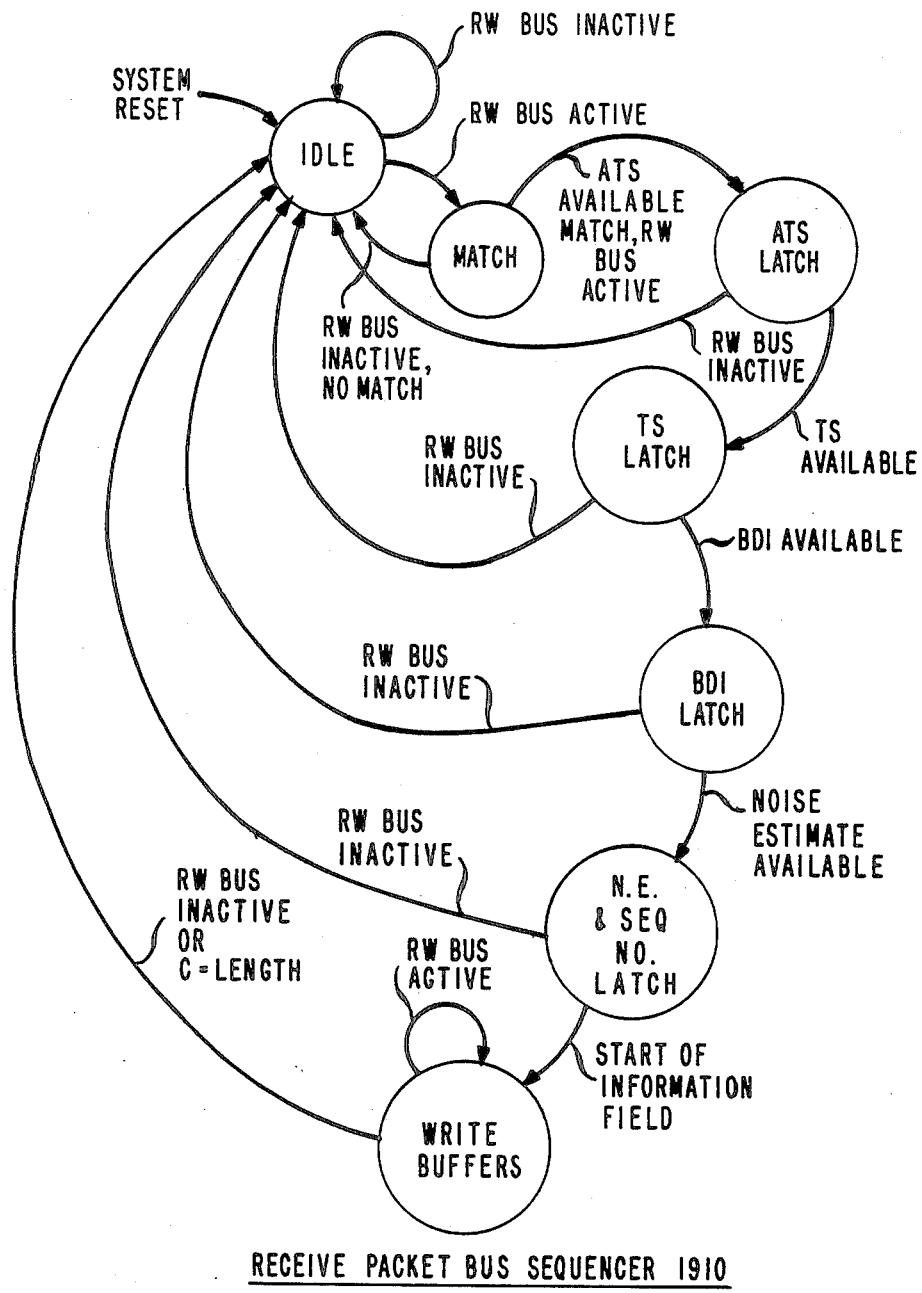
FIG. 21 shows a state diagram illustrating operations effected in receive packet bus sequencer 1910 in receive access modules 116 of FIG. 19.

FIG. 21 shows a state diagram illustrating the sequence of steps of the operation of receive packet bus sequencer 1910 in effecting writing of received packet data into receive packet buffer and reformatter 1903 and writing of the packet parameters into parameter buffer 1909. Accordingly, the IDLE state is entered from system reset. While in the IDLE state, the following actions are performed: processing of the packets is disabled on the input side to receive packet buffer and reformatter 1903, and receive packet bus sequencer 1910 waits for a receive window (R) bus active indication from receive packet bus 115 indicating that a packet is proceeding to be outputted onto receive packet bus 115. When the receive window bus becomes active, receive packet bus sequencer 1910 passes to the MATCH state. In the MATCH state, receive packet bus sequencer 1910 checks the destination code field of the incoming packet against the desintation address supplied to this particular one of receive access modules 116 from the back-plane. If there is no match, the receive packet bus sequencer 1910 remains in the MATCH state waiting for the receive window bus to become inactive. No further processing is effected on this packet since the packet is desinted for some other one of receive access modules 116. When the receive window bus becomes inactive, the receive packet bus sequencer 1910 returns to the IDLE state waiting once again for another packet to be outputted onto the receive packet bus 115. If the destination code field matches the supplied destination address, receive packet bus sequencer 1910 waits until the ATS field is available. When the ATS field is available, the ATS state is entered and the ATS field is latched in ATS latch 1908. If the receive packet window bus becomes inactive, receive packet bus sequencer 1910 returns to the IDLE state. When the time stamp field is available receive packet bus sequencer 1910 passes to the TS LATCH state. In the TS LATCH state the time stamp information is latched into POT processor and buildout delay 1907, and the POT processor is enabled to calculate the packet playout time (PPT). If the receive window bus becomes inactive, receive packet bus sequencer 1910 passes back to the IDLE state. The receive packet bus sequencer 1910 waits in the TS LATCH state until the bit dropping indicator (BDI) field is available. When the BDI field is available, the receive packet bus sequencer 1910 passes to the BDI LATCH state. In the BDI LATCH state, the received BDI is latched in BDI to receive status translator 1904 which is enabled in order to determine the receive status and length information for the following part of the packet. If for some reason the receive window bus becomes inactive while BDI processing is taking place, the receive packet bus sequencer 1910 once again passes back to the IDLE state and waits for another packet. No status information or data is written into either receive packet buffer and reformatter 1903 or parameter buffer 1909. When the noise estimate (NE) field becomes available, the receive packet bus sequencer 1910 passes from the BDI LATCH state to the NOSE ESTIMATE and SEQUENCE NUMBER LATCH state. While in this state, receive packet bus sequencer 1910 causes the noise estimate and the sequence number field to be latched and causes the sequence number processing to be enalbled in order to determine whether or not this packet is a concatenate packet or a scheduled packet. A counter is also loaded at this time with the length value of the packet which was obtianed in the BDI LATCH state and was provided to receive packet bus sequencer 1910 by BDI to receive status translator 1904. This length value indicates whether any one or more fo the enhancement bit fields have been dropped from the packet information field. When the packet information field begins, receive packet bus sequencer 1910 passes to the WRITE BUFFERS state. Upon entry into the WRITE BUFFERS state, all the processed results of the header processing are written into the parameter buffer 1909. The buffer writing is enabled by the write signal (PBWRT) which is supplied to parameter buffer 1909. While int he WRITE BUFFERS state, receive packet buffer and reformatter 1903 is enabled via a write (WRT) signal so that the information field of the packet may be written. Receive packet bus sequencer 1910 also provides the write address (WRT ADDR) to receive packet buffer 1903 so that the byte of data being written may be storroed in an appropriate memory location associated with the particular time slot that the packet is being trnasmitted in. When each byte of the information field is available, a counter (C) in receive packet bus sequencer 1910 is decremented until it finally times out. When the receive window bus becomes inactive because of the end of a packet or the counter C times out to the appropriate length of the packet, the writing of receive packet buffer and reformatter 1903 is disabled and the receive packet bus sequencer 1910 passes back to the IDLE state waiting for the next packet.

Figure 22:
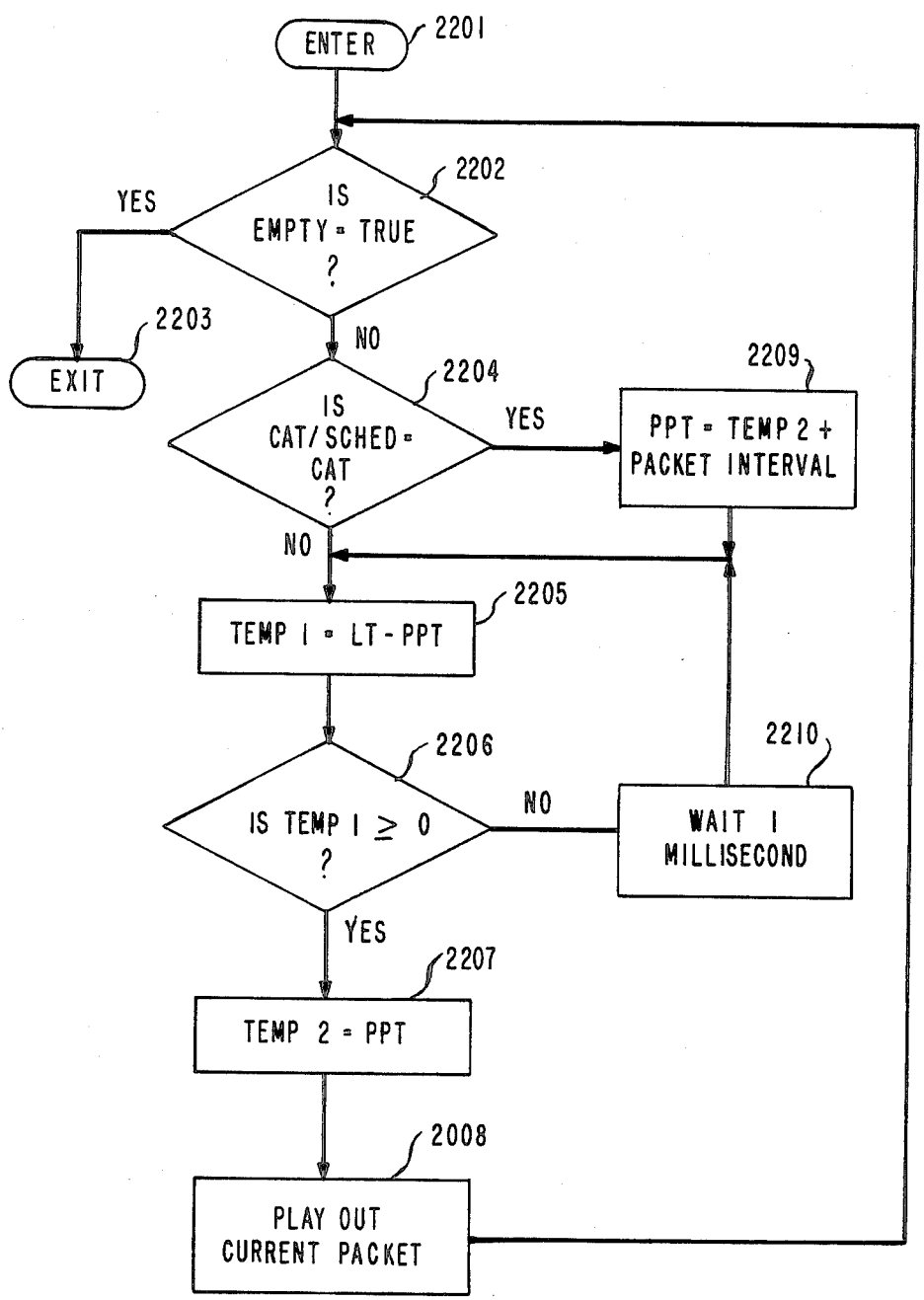
FIG. 22 is a flow chart of a sequence of operations effected in receive ATS sequencer 1910 in receive access modules 116 of FIG. 19.
Figure 23:
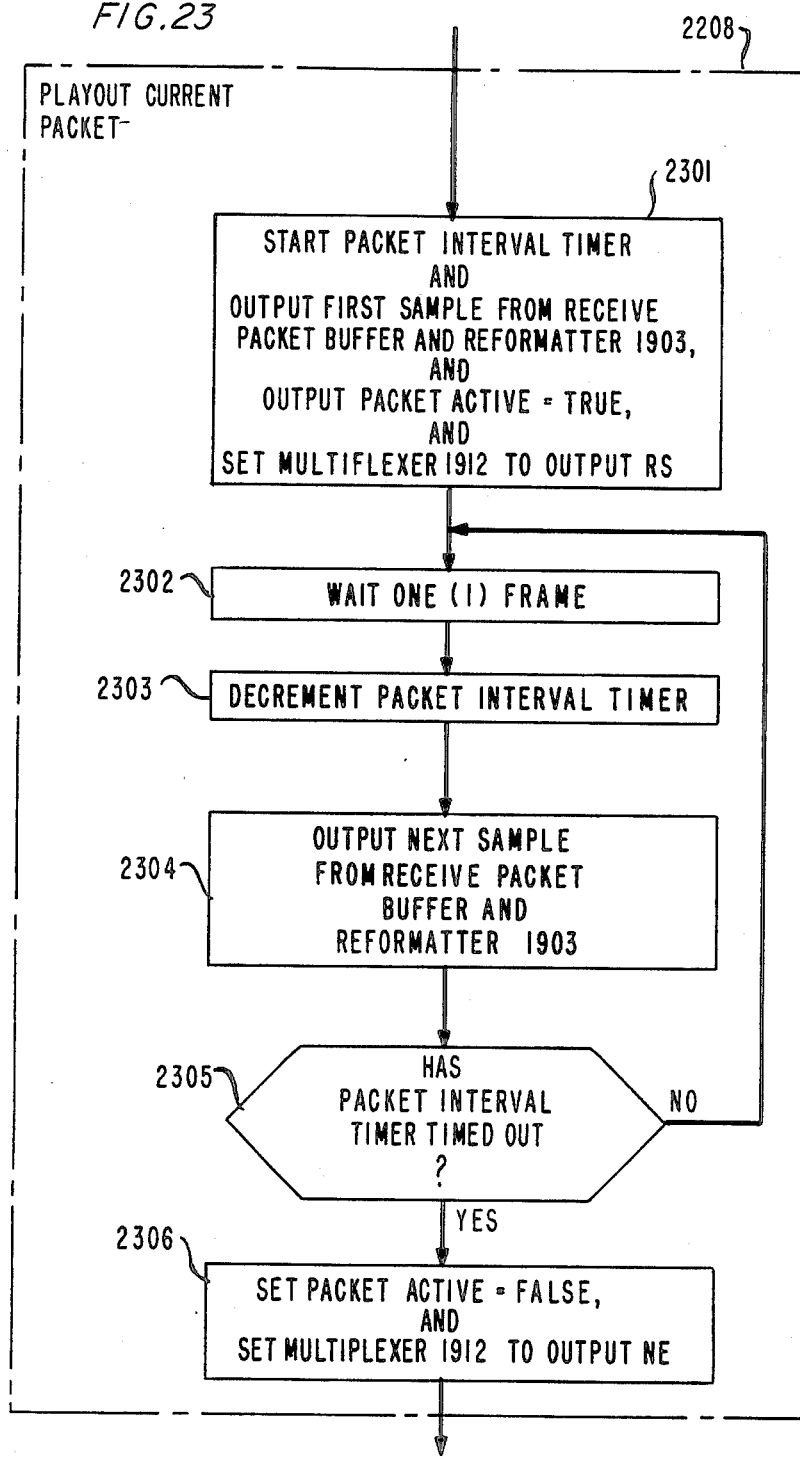
FIG. 23 is a flow chart of a sequence of steps effected in the play out current packet step 2208 in the flow chart of FIG. 22.

FIG. 22 shows a flow chart illustrating the operation of receive ATS sequencer 1911. FIG. 23 depicts in flow chart form details of the play out current packet step of operation block 2208 in the flow chart of FIG. 22.

Accordingly, the sequence of operations is entered via oval 2201. Thereafter, conditional branch point 2202 tests to determine if there is a packet to be played out of receive packet buffer and reformatter 1903. This is determined by evaluating the EMPTY signal from parameter buffer 1909 to detemrine if it is true, i.e., a logical 1. If the test result in step 2202 is YES parameter buffer 1909 is empty and there is no packet in receive packet buffer and reformatter 1903 to be read out. The sequence is thereafter exited via step 2203. If the rest result in step 2202 is NO, the EMPTY signal is false, i.e., a logical 0, indicating that there is a packet in receive packet buffer and reformatter 1903 ot be read out, and control passes to conditional branch point 2204. Conditional brach point 2204 tests to determine whether the packet is a concatenate packet or a scheduled packet. This is achieved by testing the cat/sched (C/S) signal. If C/S is a logical 0 the packet is a scheduled (sched) packet and if C/S is a logical 1 the packet is a concatenate (cat) packet. Thus, if the test result in step 2204 is NO, the packet is a scheduled packet and operational block 2205 generates a value $Temp1 = LT - PPT$, where LT is the current local time value and PPT is the packet playout time from parameter buffer 1909 which was generated in POT processor and buildout delay unti 1907. Temp1 is a temporary variable that is used to determine whether the current packet is a so-called late packet. In this example, a packet is defined as late if it arrives late relative to the buildout (BLD) delay value. If the particular packet is late the value of Temp1 is either equal to or greater than zero (0). That is, the present local time (LT) value is equal to or greater than PPT > Conditional branch point 2206 tests to determine if Temp1 is equal to or greater than 0. If the test result in step 2206 is NO, operational block 2210 causes a wait interval of one local time interval to occur. In this example, the local time interval is one (1) millisecond. Thereafter, control passes back to operational block 2205 and a new Temp1 value is generated. Steps 2205, 2206 result, which indicates that the reading to of samples from the information field of the current packet from receive packet buffer and reformatter 1903 should be initiated. The loop including steps 2204, 2205 and 2210 causes a scheduled packet to be read out at the local time value equal to the packets playout time (PPT) to achieve the desired fixed overall delay value. Additionally, it is noted that if the particular packet being processed is a late packet the local time (LT) value is equal to or greater than PPT and step 2206 will immediately yield a YES result. Control then passes via step 2207 to step 2208 and initiation of reading out of the packet information field samples is effected immediately. To this end, operational block 2207 generates temporary variable $Temp2 = PPT$, where PPT is the packet playout time of the current packet. Thereafter, operational block 2208 causes the samples in the information field of the current packet to be read out of receive packet buffer and reformattter 1903. Details of step 2208 are shown in the flow chart of FIG. 23 and described below. After all the samples of the information field of the current packet have been read out, control is returned to conditional branch point 2202. Assuming, there are additional packets in the information spurt, step 2202 yields a NO result. Thereafter, step 2204 tests to determine whether the packet is a concatenate packet. Since this is an additional packet in the information spurt, step 2204 yields a YES result and operational block 2209 sets PPT equal to the Temp2 value plus the packet interval. In this example, the packet interval is 16 milliseconds. Then, operational block 2204 again generates $Temp1 = LT - PPT$. Step 2206 again tests to determine whether Temp1 is equal to or greater than zero (0). Once the packet playout time occurs, control passes immediately via operational block 2207 to operational block 2208 and reading out of samples from the late packet information field is initiated immediately. If the packet playout time has not occurred yet, the test result in step 2206 is NO and operational block 2210 causes a one millisecond wait interval and control passes back to operational block 2205. Steps 2205, 2206 and 2210 are iterated until Temp1 is equal to or greater than zero. Since this is a concatenate packet the loop including steps 2205, 2206 2210 causes the packet interval to elapse, in this example, 16 milliseconds. Thereafter, steps 2207 and 2208 are iterated. Steps 2202 and 2204 through 2210 are repeated until there are no more packet information fields to be read out of receive packet buffer and reformatter 1903 as indicated by the EMPTY signal from parameter buffer 1909 being TRUE. Thereafter, the sequence is exited via 2203.

FIG. 23 is a flow chart of a sequence of steps in the play out current packet step 2208 of FIG. 22. Accordingly, operational block 2301 causes a packet interval timer in receive ATS sequencer 1911 (not shown) to be started; causes the read (RD), read address (RD ADDRS) and read bank select (RD BAN SEL) signals to be supplied to receive packet buffer and reformatter 1903 for reading out the first sample of the current packet information field therefrom; causes a TRUE packet active signal to be supplied to decoder 1902; and causes multiplexer 1912 to be set for supplying the receive status (RS) signal via the RCV allocation signal to decoder 1902. It should be again noted that the reformatting of the samples is realized by writing the information bits into receive packet buffer and reformatter 1903 in serial form and, then, reading them out in parallel form. Operational block 2302 causes receive ATS sequencer 1911 to wait one (1) frame interval. In this example, the frame interval is the PCM frame interval of 125 microseconds. operational block 2303 causes the packet interval timer to be decremented by the frame interval. Operational block 2304 causes receive ATS sequencer 1911 to read the next information field sample from receive packet buffer and reformatter 1903. Conditional branch point 2305 tests to determine whether the packet interval timer has timed out. If the tests result in step 2305 is NO, there are more samples to be read from receive packet buffer and reformatter 1903 and control passes again to operational block 2302. Steps 2302 through 2305 are iterated until the packet timer has timed out. This indicates the end of the particular packet information field. Again, in this example the packet interval is 16 milliseconds. When the packet interval timer has timed out, conditional branch point 2305 yields a YES test result and operational block 2306 causes the packet active signal to be set to FALSE, i.e., a logical 0 and causes multiplexer 1912 to be set to supply the noise estimate (NE) via the RCV allocation signal to decoder 1902. The noise estimate (NE) is supplied to decoder 1902 during silent intervals. Thereafter, control passes back to conditioal branch point 2202 (FIG. 22) to determined if receive packet buffer and reformatter 1903 includes additional packet information fields to be read out. It should be noted that the samples being supplied to decoder 1902 are, in this example, either 8-bit PCM, 4-bit ADPCM, 3-bit ADPCM, 2-bit ADPCM, 4/3-bit embedded coding ADPCM, 4/2-bit embedded coding ADPCM or 3/2-bit embedded coding ADPCM. The receive status (RS) signal includes a plurality of bits which indicate the type of coding that is used in the sample being read out and, consequently, being supplied to decoder 1902. Again, in this example if the coding is 8-bit decoder 1902 is bypassed.

Figure 24:
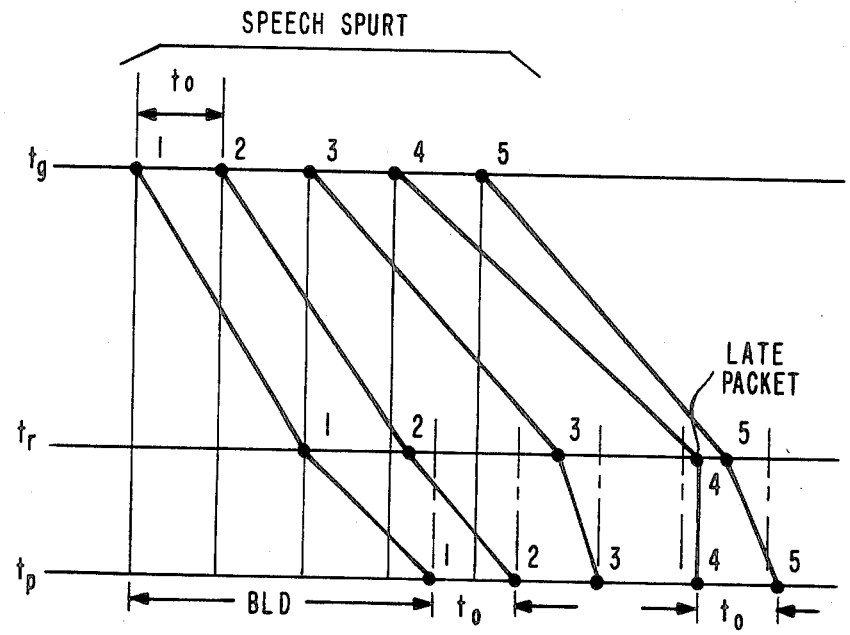
FIG. 24 illustrates delays experienced by packets in transmission and the playing out of such packets in access iterface receiver 102.

FIG. 24 shows in graphical form the generation of individual packets in a speech spurt, i.e., and information spurt, in transmitter 101 and the recovery of those generated packets in receiver 102. As shown, the packets are generated in access interface transmitter 101 at the packet originate interval ($t_o$) which in this example is 16 milliseconds. The transmitted packets are received at access interface receiver 102 at arbitrary intervals with random transmission delays as indicated by the packet receive time ($t_r$). Then, shown is the attempted equalization of the random delays caused in the transmission of the packets as indicated by the packet playout time ($t_p$). As shown, the playout time of the initial packet in the information spurt is built out to the network buildout delay (BLD). Upon playout of the initial packet, the subsequent packets are played out at the packet originate interval ($t_o$), which is, in this example, 16 milliseconds, for packets in a continuous information spurt. In accordance with an aspect of the invention, late packets are played out immediately upon being received. As indicated in FIG. 24, packet 4 is late and is played out immediately. Thereafter, packet 5 is played out as a packet concatenated to the later packet 4 by the packet disassembler.

Encoder

FIG. 25 shows in simplified block diagram form details of encoder 204 employed in voice processing module 201 of FIG. 2. Encoder 204 is employed to encode voiceband PCM signals, i.e., speech, voiceband data and tones into ADPCM signals. In this example, 8-bit $\mu$-law PCM signals are converted to linear form and, then, encoded into one of several possible ADPCM signals. For example, linear PCM samples may be converted into 4 bit, 3 bit or 2 bit ADPCM samples. Additionally, the ADPCM samples may include so-called embedded coding. For example, the outputsamples may be 4/2-bit embedded coding, 4/2-bit embedded coding or 3/2-bit embedded coding. As indicated above, such coding arrangements are known in the art. See, for example, U.S. Pat. No. 4,437,087 issued Mar. 13, 1984 for an adaptive ADPCM coding arrangement. Also, see U.S. Pat. No. 4,519,073 issued May 21, 1985 for a variable rate adaptive ADPCM coding arrangement.

Accordingly, in FIG. 24 linear PCM samples $s_1(k)$ are supplied to a plus (+) input of differnece circuit 2501 and a sample estimate $s_e(k)$ is supplied from adaptive predictor 2506 to a minue (−) input of difference circuit 2501 which generates a difference sample d(k). Difference sample d(k) is supplied to variable rate quantizer 2502 which, under control of a control signal supplied via bit rate controller from controller 207 (FIG. 2), generates the ADPCM output sample I(k). Variable rate quantizer 2052, in this example, includes three separate adaptive quantizers for generating either the 4-bit, 3-bit or 2-bit ADPCM sample I(k) under control of controller 207 (FIG. 2). Such adaptive quantizers are known in the art. See, for example, CCITT Recommendation G.721 "32 kbit/s Adaptive Differential Pulse Code Modulation (ADPCM)", VIIIth CCITT Plenary Assembly, Maloga-Torremolinos, Spain, Vol. 111, pp. 125–159, October 1984, for one such adaptive quantizer. The ADPCM sample I(k) is supplied to quantizer adaptation unit 2503, variable rate inverse quantizer 2504 and to packet assembler 202 (FIG. 2). Variable rate inverse quantizer 2504 also includes three adaptive inverse quantizers which perform the inverse functions of the adaptive quantizers of variable rate quantizer 2502 and generate a quantized version of the difference sample, namely, $d_q(k)$. Again, the particular one of the inverse quantizers that is used is under control of control signals supplied via bit rate controller 2510 from controller 207 (FIG. 2). The adaptive inverse quantizers are, in this example, 4-bit, 3-bit and 2-bit and are selected depending on the particular coding being used. For example, if 4/2-bit embedded coding is being used in a particular time slot, a 4-bit adaptive quantizer is selected in variable rate quantizer 2502 and a 2-bit variable rate adaptive inverse quantizer is selected in variable rate inverse quantizer 2504. An example of an adaptive inverse quantizer that may be employed in variable rate inverse quantizer 2504 is disclosed in the CCITT Recommendation G.721 cited above. The quantized version of the difference sample $d_{1\,q}(k)$ is supplied to one input of summing circuit 2505 and the sample estimate is supplied to another input of summing circuit 2505 which provides the algebraic sum thereof at its output, namely, reconstructed sample $s_r(k)$. The reconstructed sample $s_r(k)$ is supplied to adaptive predictor 2506. Adaptive predictor 2506 generates estimate sample $s_e(k)$ which is an estimate of the linear PCM input sample $s_l(k)$. One such adaptive predictor is also disclosed in the CCITT Recommendation G.721 cited above. Variable rate quantizer adaptation unit 2503 generates the quantizer and inverse quantizer adaptation scale factors $y_a(k)$ and $y_b(k)$, respectively. Scale factor $y_a(k)$ is supplied to the variable rate quantizer 2502 and scale factor $y_b(k)$ is supplied to variable rate inverse quantizer 2504. Again, variable rate quantizer adaptation unit 2503 includes three quantizer adaptation units, in this example, one for 4-bit, one for 3-bit and one for 2-bit quantization. The selection of the particular one or ones of the quantizer adaptation units is also under control of control signals supplied via bit rate controller 2510 from controller 207 (FIG. 2). By way of an example, if 4/2-bit embedded coding is being used, 4-bit scale factor $y_a(k)$ adaptation is selected for variable rate quantizer 2502, and 2-bit scale factor $y_b(k)$ adaptation is selected for variable rate inverse quantizer 2504. As is apparent, the scale factor adaptation selected under control of controller 207 has to match the adaptive quantizer selected in variable rate quantizer 2502 and also the inverse adaptive quantizer selected in variable rate inverse quantizer 2504. One such quantizer adaptation unit including an adaptation speed control and a quantizer scale factor adaptation unit is disclosed in the CCITT Recommendation G.721 cited above.

Both variable rate quantizer adaptation unit 2503 and adaptive predictor 2506 have so-called state variables that are updated in the adaptation process. For simplicity and clarity of description, these are illustated as being in state variables unit 2507. Typically, such state variables are stored in memory locations (not shown) and are updated during each sample interval (k). It will be apparent to those skilled in the art that variable rate quantizer adaptation unit 2503 state variables are contained in the adaptation speed control and the quantizer scale factor adaptation unit in the individual quantizer adaptation units used therein and that the predictor 2506 state variables are the predictor coefficients. These state variables may be initialized by setting the values in the memory locations to prescribed values and may be held constant by inhibiting updating of the stored values in well knonw fashion. In this example, the state variables in the scale factor adaptation units are those for DELAYB and DELAYC (see pages 138-139 of the CCITT Recommendation G.721 cited above) and in the adaptation speed control units the one for DELAYA (see page 141 of the CCITT recommendation G.721). The state variable values for the adaptive predictor 2506 are the predictor coefficients. These state variables are also disclosed in the CCITT Recommendation G.721 cited above.

Also included in encoder 204 are control elements for controlling the encoder state variables, in accordance with an aspect of the invention, in order to recover from transmission errors and lost packets, and to minimize the effects of artificial gaps in the receive information. In accordance with one aspect of the invention, the values of the state variables are held constant, i.e., not updated, upon the particular transmission channel activity becoming inactive until a predetermined interval has elapsed or the transmission channel status becomes active, whichever occurs first. If the transmission channel status becomes active before the predetermined interval has elapsed, the hold state is terminated and adaptation of the state variables resumes. If the predetermined interval elapses, then the state variables are initialilzed to prescribed values. Again, the state variables to be initialized are contained in variable rate quantizer adaptation unit 2503 and in adaptive predictor 2506. It is noted that the state variables are actually contained in adaptation speed control units and quantizer scale factor adaptation units within the particular quantizer adaptation units comprising variable rate quantizer adaptation unit 2503. Particular values of the state variables are disclosed in the CCITT Recommendation G.721 cited above. In this example, the initial value of state variable DELAYA in the adaptation speed control is zero (0), the initial values of state variables DELAYB and DELAYC in the quantizer scale factor adaptation unit are digital 544 and digital 34816, respectively, and the predictor coefficients are initialized to zero (0) values.

The control of the state variables is realized by supplying the packet active signal from controller 207 (FIG. 2) to enable/hold decoder 2508. Enable/hold decoder 2508, in response to a true, i.e., logical 1, packet active signal, indicating a packet is being processed in a particular time slot, generates a true operate signal, a true counter reset signal and a false, i.e., logical 0, counter enable signal. When the packet active signal is false, enable/hold decoder 2508 generates a false operate signal and counter reset signal and a true counter enable signal. The operate signal is supplied to state variables unit 2507 for inhibiting, resetting or enabling their adaptation as necessary. The counter reset signal is supplied to frame counter 2509 and the counter enable signal is supplied to frame counter 2509 and time-out detector 2511. Counter 2509, in this example, counts at an 8 kHz rate up to 2048 which represents 256 milliseconds. If counter 2509 times out, a true output signal is generated which is supplied to time-out detector 2511. Counter 2509 is incremented for each frame that no packet is present. The count of 2048 was selected so that the state variables would not be initialized during the interval between words during normal speech. Time-out detector 2511, in response to a true counter enable signal and a false time-out signals, generates a true hold signal and a false initialize signal. When the counter enable signal and time-out signal are both true, a false hold signal and a true initialize signal are generated. When both the counter enable and time-out signals are false, time-out detector 2511 generates false hold and initialize signals. The hold and initialize signals are supplied to state variables unti 2507 to control the state variables accordingly, the reason for holding the state variables constant is to preserve the speech signals adaptation for so-called intersyllabic speech gaps. Consequently, the variables are only initialized when the gaps are greater than a predetermined interval, in this example, 2048 frames or one quarter second.

Figure 26:
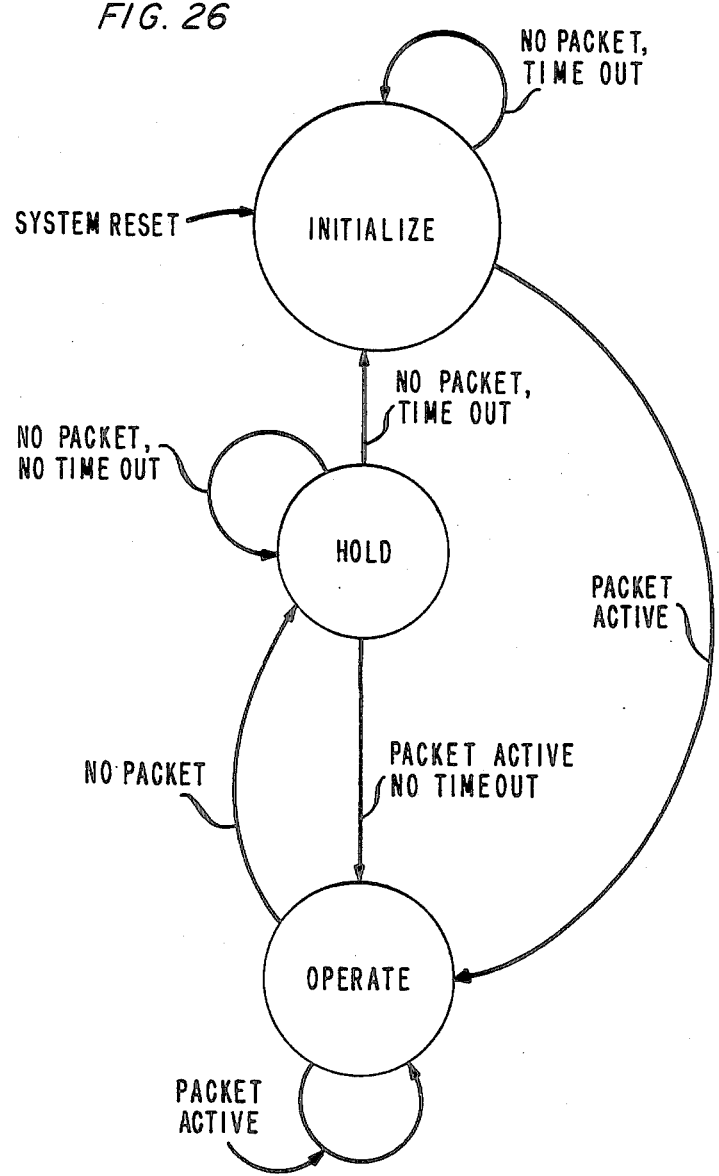
FIG. 26 shows a state diagram illustrating operation of aspects of encoder 205.

FIG. 26 is a state diagram which illustrates the encoder 204 state variables control operation. Accordingly, the INITIALIZE state is initially entered from system reset. The state variables are initialized upon the counter enable signal being true and frame counter 2509 yielding a true time-out signal, indicating it has "timed-out". Again, the state variables of the quantizer adaptation units in variable rate adaptation unit 2503 and of adaptive predictor 2506 are initialized to the values indicated above by storing those values in appropriate memory locations. Upon the packet active signal being true, indicating a packet is being processed, the OPERATE state is entered and enable/hold decoder 2508 generates true operate and reset signals and a false counter enable signal. Consequently, adaptation of the state variables is enabled and frame counter 2509 is reset to zero (0). This OPERATE state is maintained and encoder 204 adaptation continues until the packet active signal becomes false, indicating no packet is being processed. Then, the HOLD state variables and counter enable state is entered. In this HOLD state, enable/hold decoder 2508 generates false operate and counter reset signals and a true counter enable signal. Time-out detector 2511 generates a true hold signal and a false initialize signal. Consequently, the values of the state variables are inhibited from being updated and are held constant. This HOLD state is maintained as long as there is no packet being processed and frame counter 2509 has not timed out. If a packet subsequently appeared, as indicated by the packet signal being true and the counter 2509 has not timed out, the OPERATE state is again entered and operation is as described above. If no packet is present and frame counter 2509 times out as indicated by a true time-out signal, timeout detector 2511 generates a true initialize signal and a false hold signal and the INITIALIZE state is again entered and the state variables are initialized as described above. The INITIALIZE state is maintained until a packet is again present.

Decoder

Figure 27:
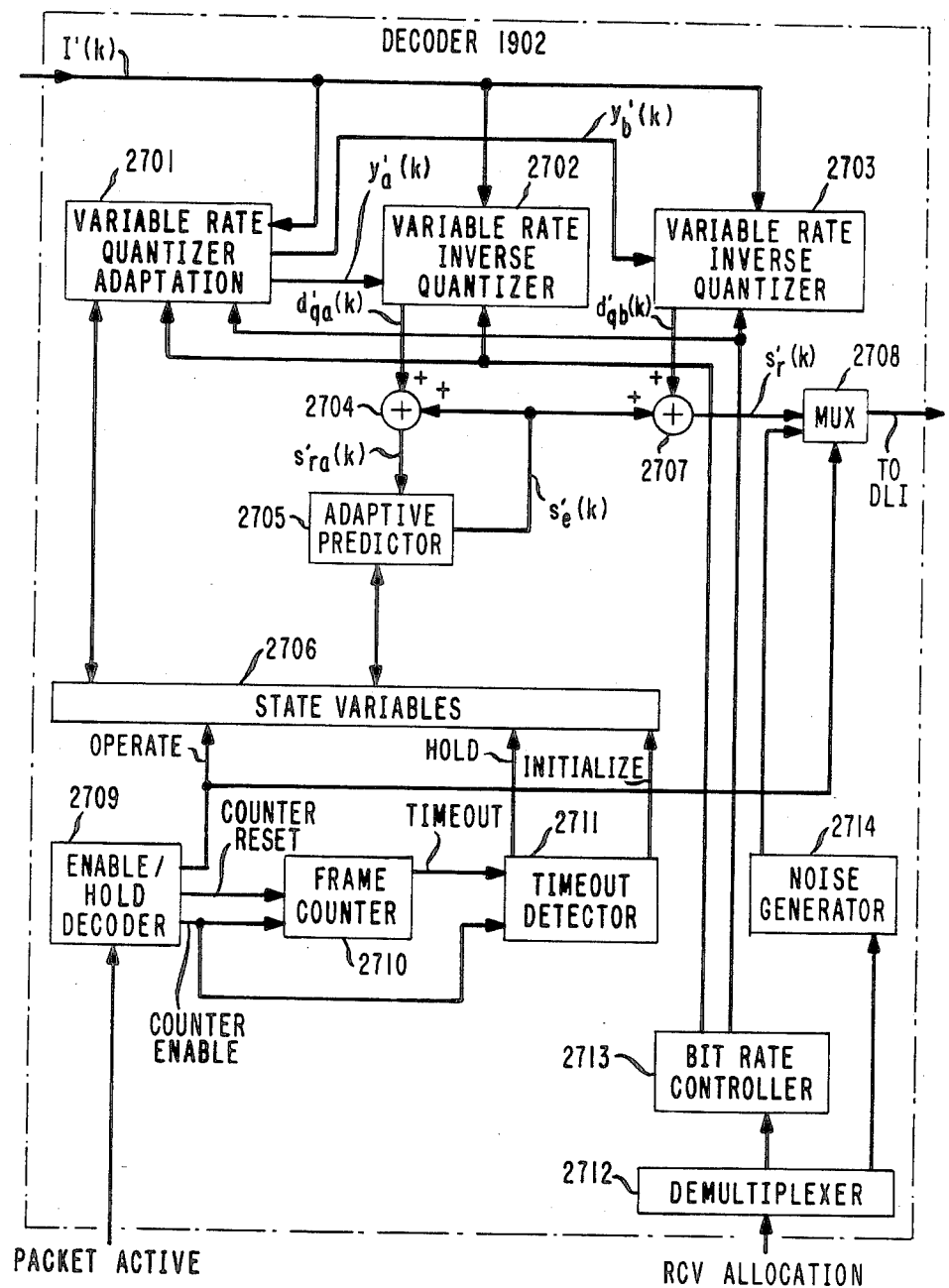
FIG. 27 depicts in simplified block diagram form details of decoder 1902 used in receive access modules 116 of FIG. 19.

FIG. 27 shows in simplified block diagram form details of decoder 1902 employed in receive access modules 116 of FIG. 19. Decoder 1902 is employed to decoder ADPCM signals back into PCM signals. In this example, 4-bit, 3-bit or 2-bit ADPCM samples are decoded into linear PCM form. Additionally, the ADPCM samples may include so-called embedded coding. For example, the samples may be 4/3-bit embedded coding, 4/2-bit embedded coding or 3/2-bit embedded coding. As indicated above, such coding arrangements are known in the art. Again, see U.S. Pat. No. 4,437,087 for an adaptive ADPCM decoder arrangement.

Accordingly, in FIG. 27 the ADPCM samples I'(k) from packet disassembler 1901 (FIG. 19) are supplied to variable rate quantizer adaptation unit 2701, variable rate inverse quantizer 2702 and variable rate inverse quantizer 2703. Variable rate quantizer adaptation unit 2701 is identical to variable rate quantizer adaptation unit 2503 of encoder 204 described above and is responsive to control signals from bit rate controller 2713 to select the appropriate one or ones of the plurality quantizer adaptation units (not shown) to generate scale factor $y'_a(k)$ and $y'_b(k)$.

Figure 28:
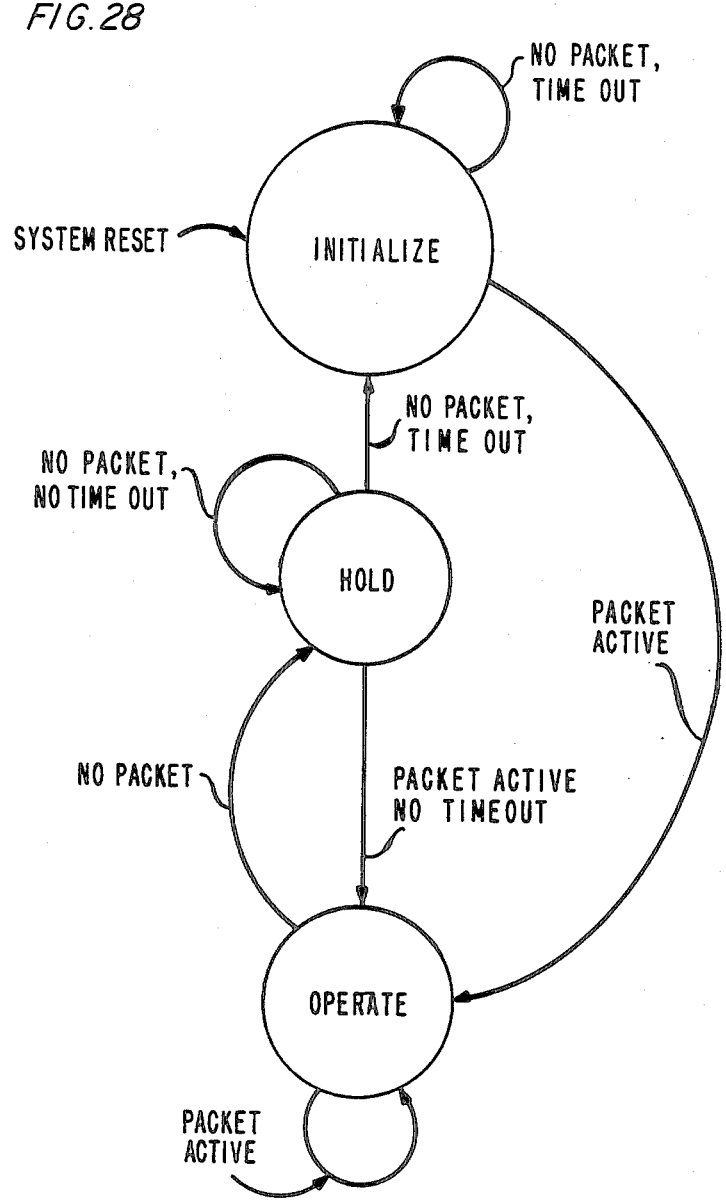
FIG. 28 shows a state diagram illustrating operation of aspects of decoder 1902.

Scale factor $y'_a(k)$ is supplied to the selected one of the inverse quantizers in variable rate inverse quantizer 2702. Similarly, scale factor $y'_b(k)$ is supplied to the selected one of the inverse quantizers in variable rate inverse quantizer 2703. Variable rate inverse quantizer 2702 and variable rate inverse quantizer 2703 each includes a plurality of adaptive inverse quantizers. In this example, a 4-bit adaptive inverse quantizer, a 3-bit adaptive inverse quantizer and a 2-bit adaptive inverse quantizer. Both variable rate inverse quantizer 2702 and variable rate inverse quantizer 2703 are identical to variable rate inverse quantizer 2504 of encoder 204 described above. The particular adaptive inverse quantizer used in variable rate inverse quantizer 2702 and in variable rate inverse quantizer 1703 depends on the ADPCM coding being used, i.e., 4-bit, 3-bit, 2-bit, 4/3-bit embedded coding, 4/2-bit embedded coding or 3/2-bit embedded coding. Variable rate inverse quantizer 2702 generates a quantized version of the original difference sample $d'_{ga}(k)$ which is supplied to summer 2704. Similarly, variable rate inverse quantize 2703 generates a quantized version of the difference sample $d'_{gb}(k)$. Quantized difference samples $d'_{ga}(k)$ and $d'_{gb}(k)$ are the same for the 4-bit, 3-bit and 2-bit ADPCM coding but are different for the embedded coding. For example, if the ADPCM coding is 4/2-bit embedded coding, the adaptive inverse quantizer selected in variable rate inverse quantizer 2702 is a 4-bit type and the adaptive inverse quantizer selected in variable rate inverse quantizer 2703 is a 2-bit type. In this example, the packet network could drop the 2 bits which are not used in variable rate inverse quantizer 2703 without affecting operation of this inverse quantizer. It is further noted that the type of inverse quantizer, i.e., 4-bit, 3-bit or 2-bit, used in inverse variable rate inverse quantizer 2702 is dependent also on whether bits have been dropped. For example, if two bits have been dropped, then a 2-bit inverse quantizer is used in variable rate inverse quantizer 2702. The quantized difference sample $d'_{gb}(k)$ is supplied to summer 2707. Also supplied to summers 2704 and 2707 is sample estimate $s'_e(k)$ from adaptive predictor 2705. The output from summer 2704 is first reconstructed sample $s'_{ra}(k)$ which is supplied to adaptive predictor 2705. The output from summer 2707 is the desired output, namely, second reconstructed sample $s'_{rb}(k)$ which is supplied to multiplexer 2708. A noise signal from noise generator 2714 is also supplied to multiplexer 2708. The noise generator 2714 generates an appropriate noise signal in response to the noise estimate (NE) signal supplied thereto via multiplexer 2712 and theRCV allocation signal from packet disassembler 1901. The noise signal is inserted via multiplexer 2708 when the operate signal is false, i.e., when no pcket is present in the particualr time slot. Again, for simplicity and clarity of description, the state variables of variable rate quantizer adaptation unit 2701 and adaptive predictor 2705 are shown as state variables unit 2706. As will be apparent to those skilled in the art, the state variables of variable rate quantizer adaptation unit 2701 are included in an adaptation speed control and a quantizer scale factor adaptation unit in each of the plurality of quantizer adaptation units as described above in relationship to state variables unit 2507 (FIG. 25). Enable/hold decoder 2709, frame counter 2710 and time-out detector 2711 operate in identical fashion to enable/hold decoder 2508, frame counter 2509 and time-out detector 2511, respectively, of encoder 204 (FIG. 25) as shown in the state diagram of FIG. 28 and, consequently, will not be described again in detail. The only difference being that the packet active signal and the rcv allocation signal are supplied from packet disassembler 1901. It is important to note that both the encoder 204 and decoder 1902 are controlled in similar fashion to recover from errors and gaps so that the decoder 1902 tracks what has happened at the encoder 204. In particular, decoder 1902 will, in accordnce with an aspect of the invention, hold its state variables constant, rather than initialize them and thereby mistrack encoder 204 if the packet network 103 introduces a small gap in an information spurt that had been encoded without any such small gaps. Thus, by holding the state varibles decoder 1902 more closely racks encoder 204. Additionally, encoder 204 and decoder 1902 both initalize their state variables after long gaps, which eliminates, in accordance with an aspect of the invention, any mistracking caused by transmission errors or lost packets in the network.

Demultiplexer 2712 is supplied with the receive (RCV) allocation signal from packet disassembler 1901 and is operative to supply the receive status (RS) portion to bit rate controller 2712 and the noise estimate (NE) portion to noise generator 2714. Bit rate controller 2713, in response to the receive status signal, generates the code rate control signals for selecting (depending on the ADPCM coding being used) the appropriate quantizer adaptation unit or units in variable rate quantizer adaptation unit 2701 and the appropriate adaptive inverse quantizers in variable rate inverse quantizers 2702 and 2703. Muliplexer 2708 is responsive to the operate signal from enable/hold decoder 2709 to supply either reconstructed sample s'$_r$(k) or the noise signal to the digital line interface (DLI). specifically, when the operate signal is true, the reconstructed sample s'$_r$(k) is supplied via multiplexer 2708 to the corresponding DLI and when the operate signal is false, the noise signal is supplied via multplexer 2708 to the corresponding DLI.

What is claimed is:

1. Apparatus for reformatting digital samples from packets, each of the packets including an information field and a header having at least a time stamp field, the apparatus comprising,
    means for storing packet information fields,
    means for generating a local time signal,
    means for obtaining a packet originate time value for each received packet, said last named means including means for obtaining the difference between the value of the local time signal upon a packet arriving at the apparatus and a value from the time stamp field for said arriving packet,
    means responsive to said packet originate time value for each of said received packets and said local time signal for generating an indication signal indicative of whether a corresponding one of said received packets is late arriving at said apparatus, and
    means responsive to said indication signal for immediately initiating reading out samples from the information field of said corresponding one of the received packets from said means for storing when said corresponding one of the received packets is late arriving at said apparatus.

2. The apparatus as defined in claim 1 wherein said means for generating said indication signal includes mans responsive to said packet originate time value for generating a first time value at which initiation should occur of reading out samples from the information field of said corresponding one of the received packets from said means for storing and means for comparing said local time value to said first time value to determine whether said corresponding one of the received packets is late arriving.

3. The apparatus as defined in claim 2 wherein said means for generating said indication signal generates a first state of said indication signal indicative that said corresponding one of the received packets is late arriving when said local time value is equal to or greater than said first time value and a second state of said indication signal indicative that said corresponding one of the received packets is not late arriving otherwise.

4. The apparatus as defined in claim 3 wherein said means for initiating reading to samples is responsive to said first state of said indication signal for immediately initiating reading out samples of said late arriving packet information field from said means for storing.

5. The apparatus as defined in claim 4 wherein said mans for generating said first time value comprises means for summing said packet originate time value for said corresponding one of the received packets and a predetermined delay value.

6. The apparatus as defined in claim 5 further including means for concatenating the reading out of samples of information fields of packets arriving subsequent to said late arriving packet in an information spurt to the samples of said late arriving packet information field.

7. The apparatus as defined in claim 1 further including means for generating a control signal having a first state when there is packet information field data to be read out of said mans for storing a corresponding communication channel and a second state when there is no packet information field data to be read out of said means for storing for said corresponding communication channel, and decoder means for converting digital samples in a first digital code to digital samples in a second digital code including adaptive inverse quantizer means having adaptive state variables, adaptive predictor means having adaptive state variables and means responsive to said second state of said control signal for holding said state variables constant for up to at least a first prescribed interval and responsive to said first state of said control signal for allowing said state variables to adapt.

8. The apparatus as defined in claim 7 wherein said decoder means further includes means for initializing said decoder state variables to predetermined values.

9. Apparatus for reformatting digital samples from packets, comprising:
    means for storing packet information fields;
    means for generating a local time signal;
    mans for obtaining a packet originate time value for a particular packet;
    means responsive to said packet originate time value and said local time signal for generating an indication signal indicative of whether said particular packet is late arriving at the apparatus;
    means responsive to said indication signal for immediately initiating reading out samples of said particular packet information field from said means for storing when said particualr packet is late arriving at said apparatus;
    means for generating a control signal having a first state when there is packet information field data to be read out of said means for storing for a corresponding communication channel and second state when there is no packet information field data to be read out of said means for storing for said corresponding communication channel; and
    decoder means for converting digital samples in a first digital code to digital samples in a second digital code, said decoder means including adaptive inverse quantizer means having adaptive state variables, adaptive predictor means having adaptive state variables, means responsive to said second state of said control signal for holding said state variables constant for up to at least a first prescribed interval and responsive to said first state of said control signal for allowing said state variables to adapt and means responsive to said second state of said control signal and a signal generated upon termination of said first prescribed interval for initializing said decoder state variables.

10. The apparatus as defined in claim 9 wherein said first digital code is adaptive differential PCM and said second digital code in PCM.

11. A method for reformatting digital samples for packets, each of the packets including an information field and a header having at least a time stamp field, the method comprising the steps of, storing packet information fields, generating a local time signal, obtaining the difference between the value of the local time siganl upon each particular packet arriving and a value from the time stamp field of each said arriving particular packet, said difference being respresentative of a packet originate time for a corresponding packet, generating an indication signal in response to said packet originate time value for each said arriving particular packet and said local time signal, said indication signal being indicative of whether a corresponding one of said arriving packets is late arriving, and immediately initiating reading out samples from the stored information field of said corresponding one of said arriving packets when said indication signal indicates it is late arriving.

* * * * *

UNITED STATES PATENT AND TRADEMARK OFFICE
CERTIFICATE OF CORRECTION

PATENT NO. : 4,726,019

DATED : February 16, 1988

INVENTOR(S) : Harry W. Adelmann and George R. Tomasevich

It is certified that error appears in the above-identified patent and that said Letters Patent is hereby corrected as shown below:

Column 6, line 9, "206" should read --207--. Column 8, line 25, "ubs" should read --bus--. Column 12, line 7, "for" should read --from--; line 51, "108" should read --109--. Column 14, line 2, after "Multiplexer" insert --1103--; line 51, "timne" should read --time--. Column 15, line 11, "1105" should read --1106--; line 61, "BID" should read --BDI--; line 64, "BID" should read --BDI--. Column 16, line 58, "BID" should read --BDI--. Column 19, line 23, "packet of" should read --a packet at--; line 37, "provide dot" should read --provided to--. Column 20, line 6, "1051" should read --1501--. Column 21, line 49, "1508" should read --1509--; line 54, "1508" should read --1509--; line 64, "1508" should read --1509--. Column 22, line 11, "BUs release" should read --BUS RELEASE--; line 41, "to", second occurrence, should read --out--; line 46, "later" should read --late--; line 54, "lot" should read --slot--. Column 23, line 4, "(S)" should read --(SA)--. Column 24, line 5, "ADCM" should read --ADPCM--; line 67, "is", first occurrence, should read --in--. Column 25, line 17, after "to", second occurrence, insert --sched--; line 46, "TA" should read --TS--. Column 26, line 26, "(R)" should read --(RW)--; line 39, "desinted" should read --destined--. Column 27, line 7, "NOSE" should read --NOISE--. Column 28, line 19, after "2206" add --and 2210 are iterated until step 2206 yields a YES test--; line 20, "to" should read --out--. Column 29, line 8, "BAN" should read --BANK--; line 57, "and" should read --an--. Column 30, line 32, "24" should read --25--; line 41, "2052" should read --2502--. Column 31, line 3, "$d_1{}_q(k)$" should read --$d_q(k)$--.

UNITED STATES PATENT AND TRADEMARK OFFICE
CERTIFICATE OF CORRECTION

PATENT NO. : 4,726,019

DATED : February 16, 1988

INVENTOR(S) : Harry W. Adelmann and George R. Tomasevich

It is certified that error appears in the above-identified patent and that said Letters Patent is hereby corrected as shown below:

Column 35, line 5, "racks" should read --tracks--; line 14, "2712" should read --2713--. Column 36, line 43, "mans" should read --means--. Column 37, line 10, "for", second occurrence, should read --from--.

Signed and Sealed this

Fourteenth Day of February, 1989

Attest:

DONALD J. QUIGG

*Attesting Officer*  *Commissioner of Patents and Trademarks*